(12) United States Patent
Chew

(10) Patent No.: US 10,963,193 B2
(45) Date of Patent: Mar. 30, 2021

(54) INFORMATION PROCESSING APPARATUS EXECUTING SETTING PROCESS FOR PRINTING

(71) Applicant: BROTHER KOGYO KABUSHIKI KAISHA, Nagoya (JP)

(72) Inventor: Po Chun Chew, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/776,150

(22) Filed: Jan. 29, 2020

(65) Prior Publication Data

US 2020/0293235 A1    Sep. 17, 2020

(30) Foreign Application Priority Data

Mar. 13, 2019  (JP) .............................. JP2019-046537
Mar. 13, 2019  (JP) .............................. JP2019-046550

(51) Int. Cl.
*G06F 3/12* (2006.01)
*G06K 15/00* (2006.01)
*G06K 15/02* (2006.01)

(52) U.S. Cl.
CPC .......... *G06F 3/1204* (2013.01); *G06F 3/1257* (2013.01); *G06K 15/4065* (2013.01); *G06K 15/024* (2013.01)

(58) Field of Classification Search
CPC . G06F 3/1204; G06F 3/1257; G06K 15/4065; G06K 15/024; G06K 15/1885
See application file for complete search history.

(56) References Cited

U.S. PATENT DOCUMENTS

2010/0134806 A1*  6/2010  Fujiwara ............... G06F 3/1219
                                                 358/1.2
2010/0238498 A1*  9/2010  Okada ................... G06F 3/1205
                                                 358/1.15

FOREIGN PATENT DOCUMENTS

JP         2014-63386 A      4/2014

* cited by examiner

*Primary Examiner* — Neil R Mclean
(74) *Attorney, Agent, or Firm* — Kenealy Vaidya LLP

(57) ABSTRACT

In an information processing apparatus, a memory stores in advance a plurality of sets of setting data for printing. Each set of setting data is in association with a setting mode. The setting process in a first setting mode sets a set of setting data for a specific print whereas the setting process in a second setting mode sets a set of setting data used generally for printing. The control device executes the setting process in a current setting mode, and acquires from the printer a sheet size currently set in the printer. The control device extracts from the memory a set of setting data having a sheet size matching the acquired sheet size, and notifying information concerning a sheet size in a case where setting mode in association with the extracted set of setting data indicates a setting mode different from the current setting mode.

17 Claims, 13 Drawing Sheets

FIG. 4

| RECORD NUMBER | PAPER SIZE | | MODE | USE | PAPER TYPE | AUTO-CUT OPTION | |
|---|---|---|---|---|---|---|---|
| | WIDTH | LENGTH | | | | | |
| 1 | 30mm | 60mm | GENERAL PRINT SETTINGS MODE | | PRE-MARKED MEDIA | HALF CUT | ⋮ |
| 2 | 60mm | 30mm | CROP PRINT SETTINGS MODE | PRODUCT LABEL | DIE-CUT LABEL | NONE | ⋮ |
| 3 | 90mm | 90mm | GENERAL PRINT SETTINGS MODE | | CONTINUOUS LENGTH TAPE | CUT | ⋮ |
| 4 | 105mm | 50mm | CROP PRINT SETTINGS MODE | SHIPPING LABEL | DIE-CUT LABEL | NONE | ⋮ |
| 5 | 50mm | 105mm | | | PRE-MARKED MEDIA | CUT | ⋮ |

| PAPER SIZE | MODE |
|---|---|
| 30mm × 60mm | CROP PRINT SETTINGS MODE |
| 90mm × 90mm | GENERAL PRINT SETTINGS MODE |
| 105mm × 90mm | CROP PRINT SETTINGS MODE |
| 60mm × 30mm | CROP PRINT SETTINGS MODE |
| 90mm × 105mm | CROP PRINT SETTINGS MODE |
| 60mm × 45mm | GENERAL PRINT SETTINGS MODE |

INFORMATION PROCESSING APPARATUS EXECUTING SETTING PROCESS FOR PRINTING

CROSS REFERENCE TO RELATED APPLICATION

This application claims priority from Japanese Patent Application Nos. 2019-046537 filed Mar. 13, 2019 and 2019-046550 filed Mar. 13, 2019. The entire content of each of these priority applications is incorporated herein by reference.

TECHNICAL FIELD

The present disclosure relates to a program and an information processing apparatus that configures settings for use in printing by a printer.

BACKGROUND

According to a technology known in the art, a personal computer or other image processing apparatus receives a user selection of a paper size and a print instruction is transmitted to a printer based on the selected paper size. For example, it is known that a management server selects a suitable printing paper when the print data outputted from an information processing apparatus specifies a user-defined paper size.

SUMMARY

However, a user may not be near a printer when selecting a paper size on an image processing apparatus. In such cases, the user cannot confirm what paper is currently set in the printer, and may not select an appropriate paper size. This may result in wasted consumables. Further, if the user is not near the printer at this time, the user must expend time and effort to go to the printer in order to check the paper. There is no conventional technique coping with such problems.

In view of the foregoing, it is an object of the present disclosure to provide a technique that enables a user to select a paper size more user-friendly.

In order to attain the above and other objects, the disclosure provides a non-transitory computer readable storage medium storing a set of program instructions installed on and configured to be executed by a computer included in an information processing apparatus. The information processing apparatus further includes a communication interface and a memory. The set of program instructions, when executed by the computer, causes the information processing apparatus to access a plurality of sets of setting data for printing by a printer. The plurality of sets of setting data is pre-stored in the memory. Each set of setting data has sheet size data indicating a sheet size. Each set of setting data is in association with setting mode data indicates a setting mode set to one of a plurality of setting modes for a setting process. The setting process sets a set of setting data to be used for printing by the printer. The plurality of setting modes includes a first setting mode and a second setting mode different from the first setting mode. The setting process in the first setting mode sets a set of setting data for a specific print whereas the setting process in the second setting mode sets a set of setting data used generally for printing. The set of program instructions, when executed by the computer, causes the information processing apparatus to perform: executing the setting process in a current setting mode, the current setting mode being one of the first setting mode and the second setting mode; acquiring from the printer a sheet size currently set in the printer via the communication interface; extracting from the memory a set of setting data having sheet size data indicating a sheet size matching the acquired sheet size; and notifying information concerning a sheet size in a case where the extracting is executed successfully and setting mode data in association with the extracted set of setting data indicates a setting mode different from the current setting mode.

According to another aspect, the disclosure provides a non-transitory computer readable storage medium storing a set of program instructions installed on and configured to be executed by a computer included in an information processing apparatus. The information processing apparatus further includes a communication interface and a memory. The set of program instructions, when executed by the computer, causes the information processing apparatus to access a plurality of sets of setting data for printing by a printer. The plurality of sets of setting data is pre-stored in the memory. Each set of setting data having sheet size data indicating a sheet size. Each set of setting data is in association with setting mode data indicating a setting mode set to one of a plurality of setting modes for a setting process. The setting process sets a set of setting data to be used for printing by the printer. The plurality of setting modes includes a first setting mode and a second setting mode different from the first setting mode. The setting process in the first setting mode sets a set of setting data for a specific print whereas the setting process in the second setting mode sets a set of setting data used generally for printing. The set of program instructions, when executed by the computer, causes the information processing apparatus to perform: acquiring a set of setting data including a sheet size and a setting mode; and registering in the memory the acquired set of setting data and the acquired setting mode in association with each other. The information processing apparatus is configured to perform: executing the setting process in a current setting mode, the current setting mode being one of the first setting mode and the second setting mode; acquiring from the printer a sheet size currently set in the printer via the communication interface; extracting from the memory a set of setting data having sheet size data indicating a sheet size matching the acquired sheet size; and notifying information concerning a sheet size in a case where the extracting is executed successfully and setting mode data in association with the extracted set of setting data indicates a setting mode different from the current setting mode.

According to still another aspect, the disclosure provides a non-transitory computer readable storage medium storing a set of program instructions installed on and executed by a computer included in an information processing apparatus. The information processing apparatus further includes a communication interface and a memory. The set of program instructions, when executed by the computer, causes the information processing apparatus to access a plurality of sets of setting data for printing by a printer. The plurality of sets of setting data is pre-stored in the memory. Each set of setting data has sheet size data indicating a sheet size. Each set of setting data is in association with setting mode data indicating a setting mode set to one of a plurality of setting modes for a setting process. The setting process sets a set of setting data to be used for printing by the printer. The plurality of setting modes includes a first setting mode and a second setting mode different from the first setting mode. The setting process in the first setting mode sets a set of setting data for a specific print whereas the setting process in the second setting mode sets a set of setting data used generally for printing. The set of program instructions, when executed by the computer, causes the information processing apparatus to perform: executing the setting process in a current setting mode, the current setting mode being one of the first setting mode and the second setting mode; acquiring from the printer a sheet size currently set in the printer via the communication interface; extracting from the memory a set of setting data having sheet size data indicating a sheet size matching the acquired sheet size; and displaying setting indicated by the extracted set of setting data on the display.

According to still another aspect, the disclosure provides an information processing apparatus. The information processing apparatus includes a communication interface, a memory, and a control device. The memory stores in advance a plurality of sets of setting data for printing by a printer. Each set of setting data has sheet size data indicating a sheet size. Each set of setting data is in association with setting mode data indicating a setting mode set to one of a plurality of setting modes for a setting process. The setting process sets a set of setting data to be used for printing by the printer. The plurality of setting modes includes a first setting mode and a second setting mode different from the first setting mode. The setting process in the first setting mode sets a set of setting data for a specific print whereas the setting process in the second setting mode sets a set of setting data used generally for printing. The control device is configured to perform: executing the setting process in a current setting mode, the current setting mode being one of the first setting mode and the second setting mode; acquiring from the printer a sheet size currently set in the printer via the communication interface; extracting from the memory a set of setting data having sheet size data indicating a sheet size matching the acquired sheet size; and notifying information concerning a sheet size in a case where the extracting is executed successfully and setting mode data in association with the extracted set of setting data indicates a setting mode different from the current setting mode.

According to still another aspect, the disclosure provides an information processing apparatus. The information processing apparatus includes a communication interface, a memory and a control device. The memory stores in advance a plurality of sets of setting data for printing by a printer. Each set of setting data has sheet size data indicating a sheet size. Each set of setting data is in association with setting mode data indicating a setting mode set to one of a plurality of setting modes for a setting process. The setting process sets a set of setting data to be used for printing by the printer. The plurality of setting modes includes a first setting mode and a second setting mode different from the first setting mode. The setting process in the first setting mode sets a set of setting data for a specific print whereas the setting process in the second setting mode sets a set of setting data used generally for printing. The control device is configured to perform: acquiring a set of setting data including a sheet size and a setting mode; and registering in the memory the acquired set of setting data and the acquired setting mode in association with each other. The control device is capable of setting the registered set of setting data in the registered setting mode so that the registered set of setting data is to be used for printing by the printer.

According to still another aspect, the disclosure provides an information processing apparatus. The memory stores a plurality of sets of setting data for printing by a printer. Each set of setting data has sheet size data indicating a sheet size. Each set of setting data is in association with setting mode data indicating a setting mode set to one of a plurality of setting modes for a setting process. The setting process sets a set of setting data to be used for printing by the printer. The plurality of setting modes includes a first setting mode and a second setting mode different from the first setting mode. The setting process in the first setting mode sets a set of setting data for a specific print whereas the setting process in the second setting mode sets a set of setting data used generally for printing. The control device is configured to perform: executing the setting process in a current setting mode, the current setting mode being one of the first setting mode and the second setting mode; acquiring from the printer a sheet size currently set in the printer via the communication interface; extracting from the memory a set of setting data having sheet size data indicating a sheet size matching the acquired sheet size; and displaying setting indicated by the extracted set of setting data on the display.

BRIEF DESCRIPTION OF THE DRAWINGS

The particular features and advantages of the disclosure as well as other objects will become apparent from the following description taken in connection with the accompanying drawings, in which:

FIG. 4 is an explanatory diagram illustrating a registration database;

FIG. 5 is an explanatory diagram illustrating a paper database;

FIG. 11(*b*) is an explanatory diagram illustrating a message for confirming whether to add settings on a screen;

DETAILED DESCRIPTION

Next, a printing system according to a first embodiment will be described while referring to the accompanying drawings. In the first embodiment, the printing system includes a personal computer (hereinafter called a "PC") 1, and a printer 2 that prints on a continuous strip-like printing medium.

Figure 1:
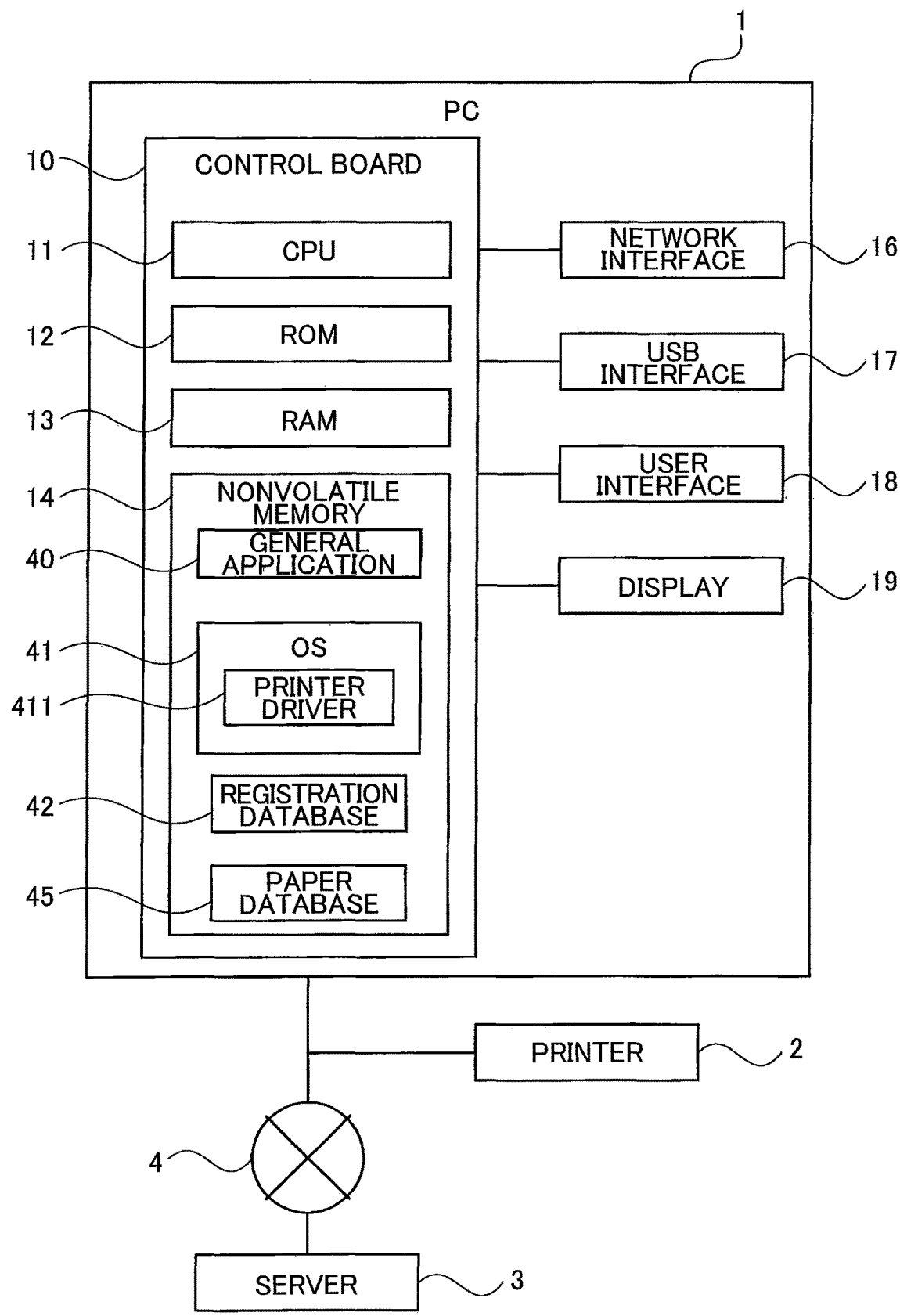
FIG. 1 is a schematic diagram illustrating a printing system according to a first embodiment.

As shown in FIG. 1, the printing system according to the first embodiment has the PC 1, the printer 2, and a server 3, all of which are connected and capable of communicating with each other via an internet 4. The PC 1 executes various processes for controlling the printer 2 to print. The PC 1 is an example of the information processing apparatus. Specifically, the PC 1 acquires image data from the server 3, receives various print settings including a setting for the paper size, and transmits a print command to the printer 2. Note that the information processing apparatus may be a smartphone or a tablet computer rather than the PC 1.

The PC 1 is provided with a control board 10 that includes a CPU 11, a ROM 12, a RAM 13, and a nonvolatile memory 14. The PC 1 also includes a network interface 16, a USB interface 17, a user interface 18, and a display 19, all of which are electrically connected to the control board 10. Note that the control board 10 in FIG. 1 is a general concept that covers the hardware and software used for controlling the PC 1 and does not necessarily represent a single piece of hardware present in the PC 1.

The CPU 11 executes various processes according to programs read from the ROM 12 or the nonvolatile memory 14 or based on user operations. The CPU 11 is an example of the computer. The ROM 12 stores a startup program for starting up the PC 1. The RAM 13 is used as a work area when the CPU 11 executes various processes, or as a storage area for temporarily storing data. The nonvolatile memory 14 is a hard disk drive or flash memory, for example. The nonvolatile memory 14 is used as an area for storing programs, such as various application programs (hereinafter simply called "applications"), data such as image data or document data, and various settings. The ROM 12, RAM 13, and nonvolatile memory 14 are all examples of the memory. Additionally, if the CPU 11 is provided with a CPU buffer, the CPU buffer is also an example of the memory.

Any of the examples of the memory may be a storage memory that can be read by a computer. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The network interface 16 includes hardware for communicating with external devices via a local area network (LAN), the internet 4 or another network. The communication method of the network interface 16 may be wired or wireless and may conform to any standard. The USB interface 17 includes hardware for performing communications based on the USB standard. Communications between the PC 1 and the printer 2 may be performed using the network interface 16 or the USB interface 17. The network interface 16 or the USB interface 17 is an example of the communication interface.

The user interface 18 includes hardware, such as a keyboard and mouse, for receiving operations inputted by the user. The display 19 includes hardware for displaying information on a screen. The display 19 is an example of the display device. Note that the PC 1 may have a touchscreen that is provided with functions of both the user interface 18 and the display 19, for example.

The nonvolatile memory 14 in the PC 1 according to the first embodiment stores a general application program (hereinafter called a "general application") 40, an operating system (hereinafter abbreviated as "OS") 41, a registration database 42, and a paper database 45.

The general application 40 is a program that enables the viewing and printing of files in prescribed formats, such as the PDF format. In the first embodiment, the general application 40 is specifically Adobe Reader (registered trademark). A printer driver 411 for controlling the printer 2 is incorporated in the OS 41. The process performed by each program will be described later. The printer driver 411 is an example of the program.

Figure 2:
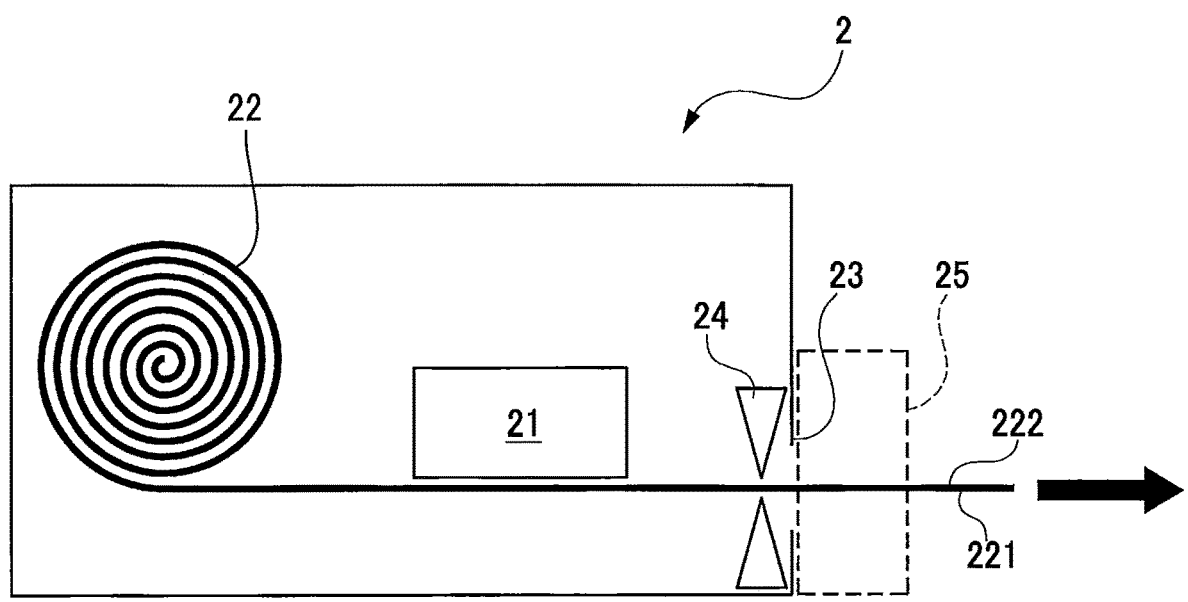
FIG. 2 is a schematic diagram illustrating internal structures of a printer.

As shown in FIG. 2, the printer 2 according to the first embodiment has a built-in print head 21 and a printing medium 22 wound in a roll. Known as a label printer, the printer 2 prints on the printing medium 22 while conveying the same. The print head 21 of the printer 2 operates according to a thermal transfer method, for example. The print head 21 is provided with an array of printing pins. The printing pins are configured of heating elements. By selectively heating individual printing pins in the print head 21, the printer 2 prints images on the printing medium 22.

The printing medium 22 employed in the printer 2 for printing includes a continuous strip of a base material 221, and a printing paper 222 affixed to one surface of the base material 221. The printer 2 feeds the printing medium 22 drawn off the roll into the print head 21 to be printed. The portion of the printing medium 22 that has been printed is pushed out of the printer 2 through a discharge opening 23, as illustrated in FIG. 2. The printer 2 is provided with a manual cutter 24, for example. The manual cutter 24 is disposed near the discharge opening 23. When operated by the user, the manual cutter 24 cuts off the portion of the printing medium 22 that protrudes out of the printer 2.

A plurality of types of paper may be used as the printing paper 222. The paper types differ according to the shape of the printing paper 222. The paper types include continuous length tape, die-cut labels, and pre-marked media, for example. The continuous length tape has a continuous strip of printing paper 222 affixed to the base material 221 which also has the continuous strip shape. A label of a prescribed length is created from the continuous length tape by cutting off the printed portion with the manual cutter 24, for example. Die-cut labels have a plurality of printing papers 222 preformed in a prescribed shape and affixed to the base material 221 at prescribed intervals. The pre-marked media includes a plurality of papers and the base material 221 whose outer surface has marks provided at prescribed intervals along the longitudinal direction, and each printing paper 222 occupies a range that includes one mark. The printing medium 22 may be a genuine product provided by the manufacturer of the printer (hereinafter called "genuine paper"), or a non-genuine product such as a generic paper roll provided by a third party (hereinafter called "non-genuine paper").

Note that the printer 2 in the embodiment may also have a size measuring function for measuring the size of the printing medium 22 set in the printer 2 and for outputting the measurement results. For example, the printer 2 may be provided with a photosensor along the conveying path. While the printing medium 22 is conveyed, the photosensor detects the presence of the printing papers 222 on the printing medium 22 or the presence of marks on the printing medium 22, and calculates the length of the printing paper 222 in the conveying direction based on the detection results. The printer 2 may be further provided with one or more photosensors arranged in an orthogonal direction of the conveying path to detect a width of the printing papers 222. Alternatively, if the printing medium 22 is a genuine product, the printer 2 may detect the paper size from an identifier, such as holes formed in a paper cassette, for example. Note that the printer 2 can store in the memory paper size settings that are set by user's operations.

With the printer 2 according to the embodiment, an optional unit 25 may be mounted on the outer side of the discharge opening 23. The optional unit 25 is a unit that can process the printed printing medium 22. For example, the optional unit 25 may have a cutter option. The cutter option can automatically cut the printing medium 22 discharged from the discharge opening 23 after printing. For example, the cutter option may be set to perform a cut after each label, or a single cut at the end of multiple labels. Further, the cutter option may be set to perform a full cut for detaching each label, or a score-cut for scoring the end of each label. For example, the cutter option may be used for creating labels that are cut from roll paper at prescribed lengths.

The printer 2 prints an image on the printing medium 22 based on print settings included in a print command received from the PC 1. The printer driver 411 has a function for displaying a print settings screen in response to a request from the general application 40 or another program, and for receiving print settings through the print settings screen.

When crop printing is supported by the printer 2, the printer driver 411 in the embodiment has a crop print settings mode for displaying a crop print settings screen in which the user can set or modify settings used for a crop print, and a general print settings mode for displaying a general print settings screen in which the user can set or modify settings generally used for printing including crop printing. In this specification, a crop print will be defined as a process of extracting part of the image to be printed and printing the extracted image on a label. A crop print is an example of the specific print. The crop print settings mode is an example of the first mode, and the general print settings mode is an example of the second mode. Parts of the general print settings may not be used in the crop print.

Figure 3:
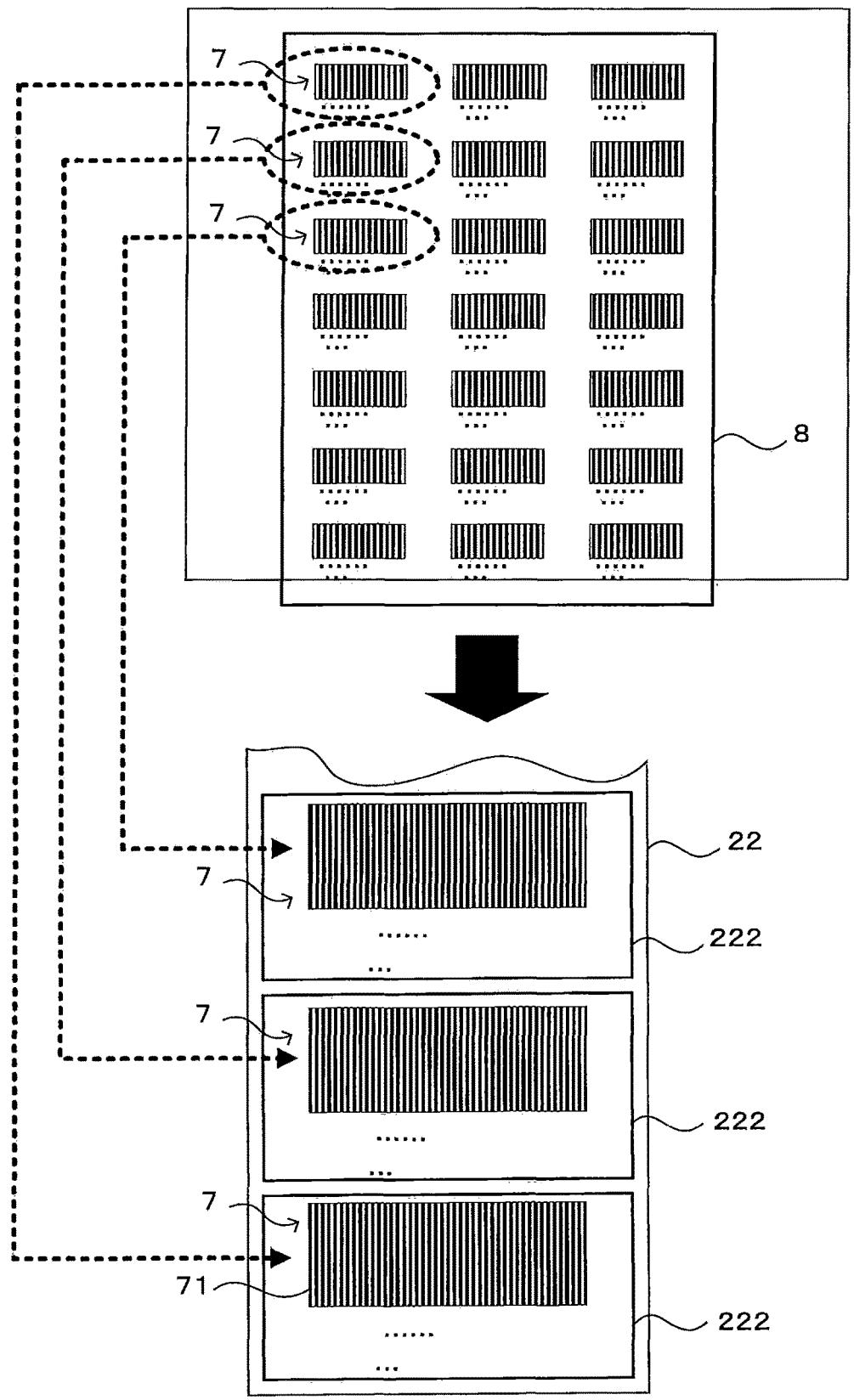
FIG. 3 is a schematic diagram illustrating crop print.

In the first embodiment, a crop print is used to print product labels or shipping labels. FIG. 3 illustrates an example of crop printing product labels. In this example, an image 8 includes one or a plurality of images 7. Each image 7 has a barcode 71. Image data for an image 7 including a barcode (hereinafter called "barcode image data") is individually extracted from the image data of the image 8, and the extracted image 7 is printed on the printing paper 222. If the image 7 is being printed on a die-cut label, normally a single image 7 is printed on a single printing paper 222. The image 7 may include an image other than the barcode 71, such as a product name, condition of the product, or the like.

When image data is for an A4-size sheet that includes one or more images for printing one or more product labels and one or more images for printing one or more shipping labels, and when crop print for printing a shipping label from the image data for the A4-size sheet, image data for an image of a shipping label is extracted from the A4-size image data and printed on a label formed of the printing paper 222. Image data for the image to be printed on a shipping label also includes barcode image data. The extracted image data may be printed on the labels a plurality of times according to an instruction received via the user interface 17. Alternatively, one or more images may be selected from images in the A4-size sheet image data via the user interface 17, and image data for selected one or more images is extracted from the A-4 size sheet image data, and the selected one or more images are printed on the labels of the printing papers 222. Crop print for printing a product label is executed similarly to the shipping label.

A barcode reader must be able to accurately read the barcode printed on the product label or the shipping label. Further, the service providing company that supplies the barcode images may also specify the size of the product label and shipping label. Sometimes the specified size is different between a product label and a shipping label. Additionally, the size of the label may have restrictions due to the size of the product, specifications defined by the delivery company, position in which the barcode is printed, and the like. Consequently, the printing paper 222 used when crop printing a product label or shipping label must have a suitable size for these restrictions. When performing a general print, the printing paper 222 need not be a size suited to the above restrictions.

The printer driver 411 has a function for communicating with the printer 2 and acquiring from the printer 2 a paper size currently-set in the printer 2. In the following description, the size of the paper in the conveying direction of the printing medium 22 will be called the "paper length," and the size in the direction orthogonal to the conveying direction will be called the "paper width." The paper width is determined by the printing medium 22 mounted in the printer 2. If the width of the printing paper 222 is narrower than the width of the base material 221, for example, the paper width is the width of the printing paper 222.

The paper length differs according to the paper type and print data. When the paper type is continuous length tape, the paper length is the range corresponding to the print target for the relevant print data and constitutes the length protruding from the discharge opening 23 after the print. When the paper type is a die-cut label, the paper length is the length of one pre-cut printing paper 222 affixed to the base material 22L When the paper type is pre-marked media, the paper length is the distance between marks in the conveying direction.

The printer driver 411 has a function for recording frequently used print settings in the registration database 42. The printer driver 411 has a function for storing a record including the paper size in the registration database 42 when a paper size acquired from the printer 2 is not recorded in the registration database 42.

As shown in the example of FIG. 4, the registration database 42 stores records 44 associating various settings, such as a record number 441, a paper size 442, a mode 443, a use 444, a paper type 445, and an auto-cut option 446.

The record number 441 is information identifying the record 44. The paper size 442 is information on the paper size of the printing paper 222 and includes a paper width and a paper length. The mode 443 is information specifying whether the record 44 is to be used with the general print settings mode or the crop print settings mode. The use 444 is information specifying the use of the printed matter and may include values specifying "product label" or "shipping label," for example. When any one of "product label" or "shipping label" is recorded as the use 444 in the embodiment, data specifying "crop print settings mode" is stored as the mode 443. When neither the product label nor shipping label is stored as the use 444, data specifying "general print settings mode" is stored as the mode 443. Note that the use 444 is an example of a setting used for a specific print.

The paper type 445 is a value specifying one of the paper types "continuous length tape," "die-cut label," and "pre-marked media." The auto-cut option 446 is information specifying whether the paper is to be automatically cut. The auto-cut option 446 stores one of the values for "cut" specifying that the paper is to be cut off automatically, "half cut" specifying that the paper is to be scored, i.e., the half of the paper is to be cut in the width direction, and "none" specifying that the paper is not to be cut. The half cut may specify that the paper is to be cut discontinuously in the width direction.

Records 44 may be automatically stored in the registration database 42 when the printer driver 411 is installed or updated, for example, and the user may record a record 44 in the registration database 42 using the user interface 18. For example, records for genuine paper may be recorded in the registration database 42 according to the former method, while records for non-genuine paper may be recorded in the registration database 42 according to the latter method.

As shown in FIG. 5, the paper database 45 stores various paper sizes (widths×lengths) and the mode that can be used with each paper size. The paper database 45 may be pre-stored in the printer driver 411 or may be acquired by issuing a request to a server or the like. The paper database 45 in the embodiment stores the crop print settings mode in association with paper sizes corresponding to at least one of product labels and shipping labels, and stores the general print settings mode in association with paper sizes corresponding to neither product labels nor shipping labels. In this example, the paper size having a paper width 30 mm and a paper length 60 mm is in association with the crop print settings mode whereas in the registration database 42 the paper size having a paper width 30 mm and a paper length 60 mm is in association with the general print settings mode. This is because a record 44 can be entered in the registration database 42 according to user's inputs for example, and thus a record 44 is not necessarily inputted based on the paper database 45.

Next, the operations of the printing system will be described. As an example, the user may input product information for each of a plurality of products in the PC 1 and the PC 1 transmit this information to the server 3. Based on the product information received from the PC 1, the server 3 creates barcode image data and transmits A4-size image data that includes one or a plurality of copies of the barcode image data to the PC 1. When the user has inputted product information for ten products, the server 3 transmits A4-size image data with barcode image data for an array of ten barcodes to the PC 1.

Figure 6:
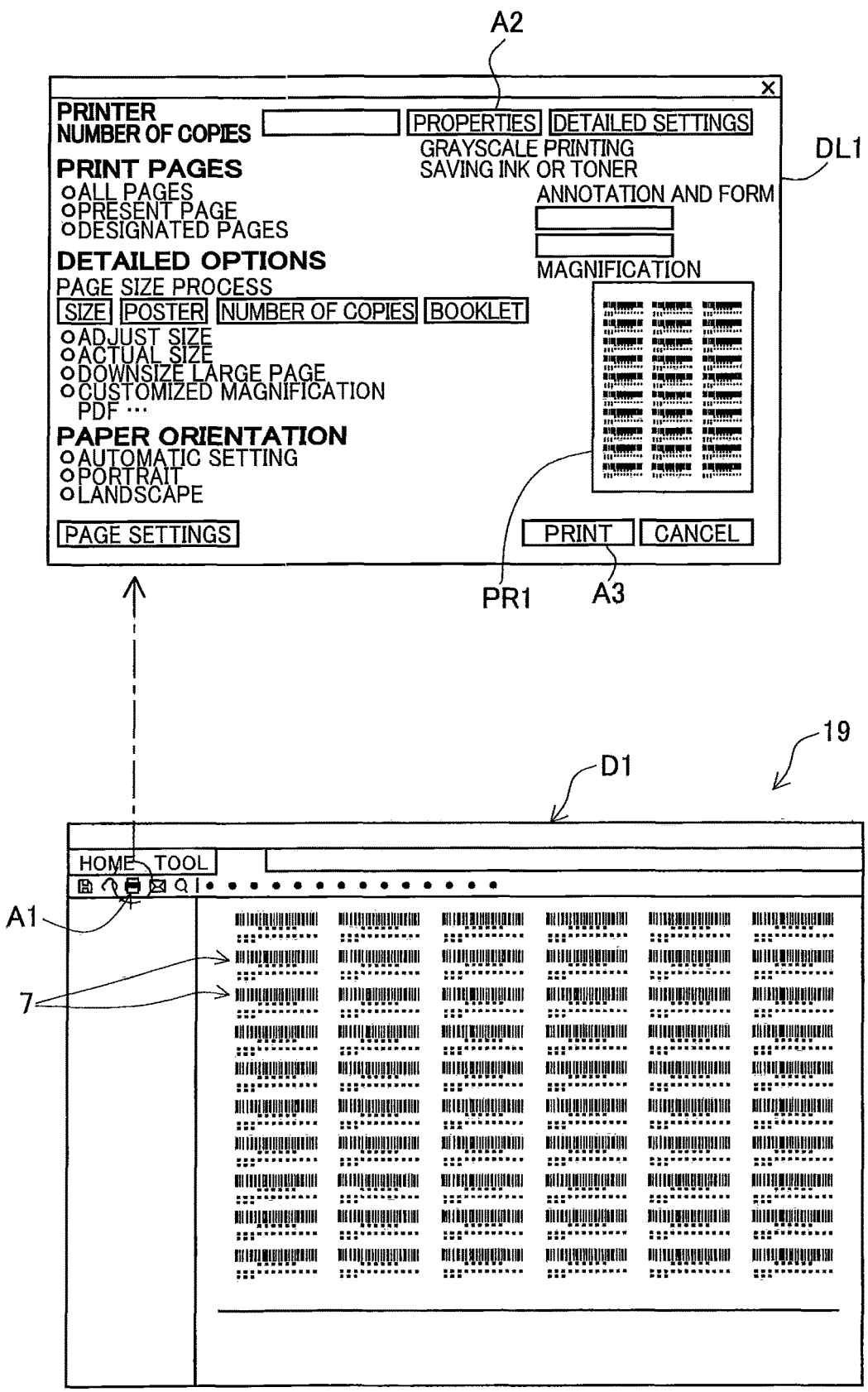
FIG. 6 is an explanatory diagram illustrating transition of screens.

In response to receiving the image data from the server 3, the PC 1 displays a label image display screen D1 on the display 19 using the general application 40, as illustrated in FIG. 6. The label image display screen D1 includes a list of images 7, each of which includes a barcode. A print button A1 is also displayed in the label image display screen D1. If the user selects the print button A1 using the user interface 18, the PC 1 displays a print settings dialog DL1 on the display 19 using the general application 40. The print settings dialog DL1 includes a preview image PR1, a Properties button A2, and a Print button A3.

When the Properties button A2 is pressed via the user interface 18, the general application 40 calls the printer driver 411 through an application programming interface (API) of the OS. When the printer driver 411 is called, the CPU 11 of the PC 1 starts up the printer driver 411 to execute the print settings process shown in FIG. 7.

In general, flowcharts in this specification depict steps performed by the CPU 11 according to instructions described in programs. In other words, actions such as "determine," "extract," "select," "calculate," "set," "identify," "acquire," "receive," "control," and the like in the following description represent steps performed by the CPU 11. Steps performed by the CPU 11 include processes that control hardware through the APIs of the OS 41 in the PC 1. In the present specification, the operations of each program are described while omitting the explanation of the OS 41. For example, the phrase "the program B controls the hardware" covers such technical details as the program B controlling the hardware C via the API of the OS 41. Further, steps performed by the CPU according to instructions described in a program may be described in abbreviated terms, such as "the CPU 11 executes" or "the program executes".

"Acquiring" is used as a concept which does not necessarily require a request. In other words, the process in which the CPU 11 receives data without requesting is included in the concept of "the CPU 11 acquires data." "Data" as described herein refer to bit strings that can be read by a computer. Data of different formats are treated as the same data when the content of the data is essentially the same. The same holds true for "information" in this specification. "Requesting" and "instructing" are concepts of transmitting to a transmission destination information indicating the request or information indicating the instruction. "Request" and "instruction" may be used to describe the information indicating the request or the information indicating the instruction.

Further, a process performed by the CPU 11 to determine whether information A indicates circumstance B may be described conceptually as "determining whether circumstance B based on information A." A process in which the CPU 11 determines whether information A indicates circumstance B or circumstance C may be described conceptually as "determining whether circumstance B or circumstance C based on information A."

Figure 7:
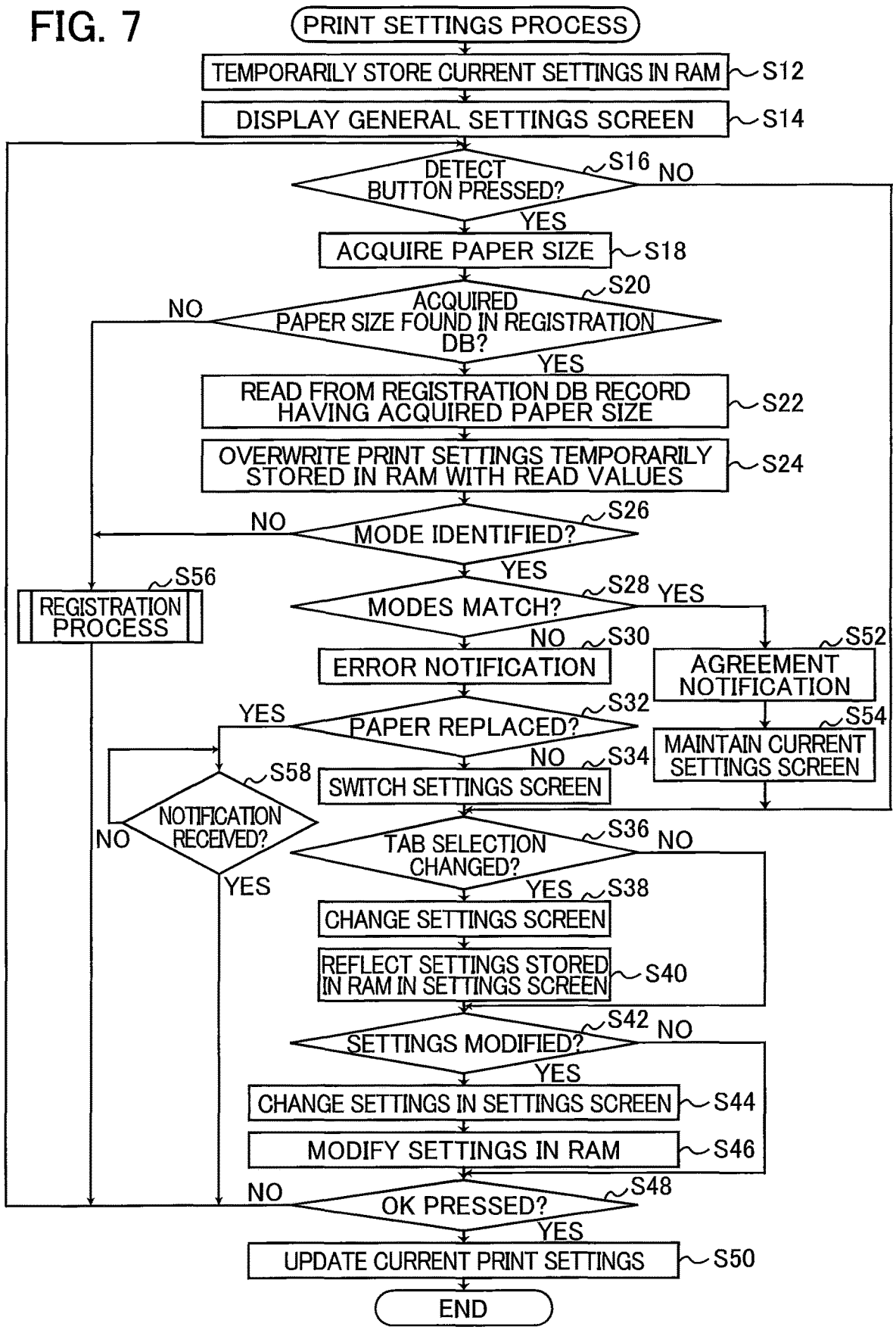
FIG. 7 is a flowchart illustrating a print settings process according to the first embodiment.

In S12 at the beginning of the print settings process in FIG. 7, the CPU 11 reads print settings currently stored in a registry and temporarily stores these settings in the RAM 13. Here, the registry is a storage area provided in the nonvolatile memory 14 for use by the printer driver 411. The current print settings may be default settings that were set when the printer driver 411 was installed, or may be settings stored in the registry after operations to modify settings were received in the screens shown in FIGS. 8 and 9 described later, for example. The print settings stored in this registry include all setting items used by the printer driver 411 when generating print data and commands to be issued to the printer.

Figure 8:
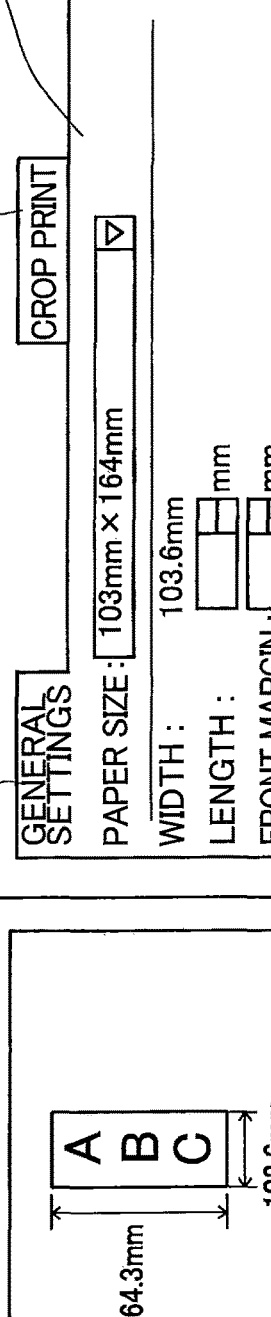
FIG. 8 is an explanatory diagram illustrating a general settings screen.

In S14 the CPU 11 displays a general settings screen D3 shown in FIG. 8 on the display 19. The general settings screen D3 is displayed when the printer driver 411 is in the general print settings mode. The general settings screen D3 is a screen for receiving settings used when not only performing crop printing but also other printings, i.e., general settings common to all printings including crop printing. The printer driver 411 is programmed to start up in the general print settings mode when the print settings process begins. Part of general print settings may not be used in some special printings such as crop printing.

The general settings screen D3 includes a general print tab TB31, and a crop print tab TB32. The general print tab TB31 is an object for receiving a command to set the printer driver 411 in the general print settings mode. The crop print tab TB32 is an object for receiving a command to set the printer driver 411 in the crop print settings mode. When the printer driver 411 is in the general print settings mode and the crop print tab TB32 is selected, the printer driver 411 enters the crop print settings mode and displays a crop print settings screen D4 shown in FIG. 9 on the display 19. Here, the crop print settings screen D4 is an example of the first settings screen, and the general settings screen D3 is an example of the second settings screen.

The crop print settings screen D4 is a screen that receives print settings used in crop prints. The crop print settings screen D4 is provided with a crop settings section SA41 that displays those settings stored in the RAM 13 that are related to crop printing. These settings are reflected in radio buttons R41-R43 provided in the crop settings section SA41. The crop print settings screen D4 is also provided with the general print tab TB31 and the crop print tab TB32. When the printer driver 411 is in the crop print settings mode and the general print tab TB31 is selected, the printer driver 411 enters the general print settings mode and displays the general settings screen D3 shown in FIG. 8 on the display 19.

Note that settings in the RAM 13 are not modified when the general print tab TB31 or the crop print tab TB32 is selected, but are rather reflected in the newly displayed settings screen.

Here, the general settings screen D3 will be described in greater detail with reference to FIG. 8. As shown in FIG. 8, the general settings screen D3 includes, in addition to the general print tab TB31 and the crop print tab TB32, a settings display area DA31, a general settings area DA32, an OK button A31, and a cancel button A33. The OK button A31 is selected to accept the print settings.

The print settings temporarily stored in the RAM 13 are displayed in the settings display area DA31. Standard setting items are displayed in the general settings area DA32. The general settings area DA32 includes a paper selection section SA31, a paper size section SA32, a copy section SA33, and an option section SA34.

The paper selection section SA31 is an entry section that receives a selection of a name for the paper size. Names of common paper sizes of various types, and names indicating paper sizes 442 already recorded in the registration database 42' in association with the basic print settings mode are displayed in the paper selection section SA31 as selections. If the name indicating a paper size 442 currently stored in the registration database 42 is selected, for example, the CPU 11 displays in the paper size section SA31 the name indicating the paper size 442 stored in the registration database 42. At least partial information in SA32 may be displayed based on the record 44 having the selected paper size in the registration database 42.

The paper size section SA32 is an entry space for receiving a paper size. The copy section SA33 is an entry space for receiving an inputted number of copies indicating the number of copies of the same label to be created. The option section SA34 is an entry space for receiving inputted information indicating whether the optional unit 25 will be used when the labels are created. For example, the option section SA34 may be provided with a checkbox with information "Cut after specified number of labels" followed by a spin button (numeric updown) for specifying number of labels to print before cutting the paper; a checkbox with information "Cut end" indicating the paper is to be cut after printing all labels; and a checkbox with information "Half cut" for performing a score cut through the paper.

Figure 9:
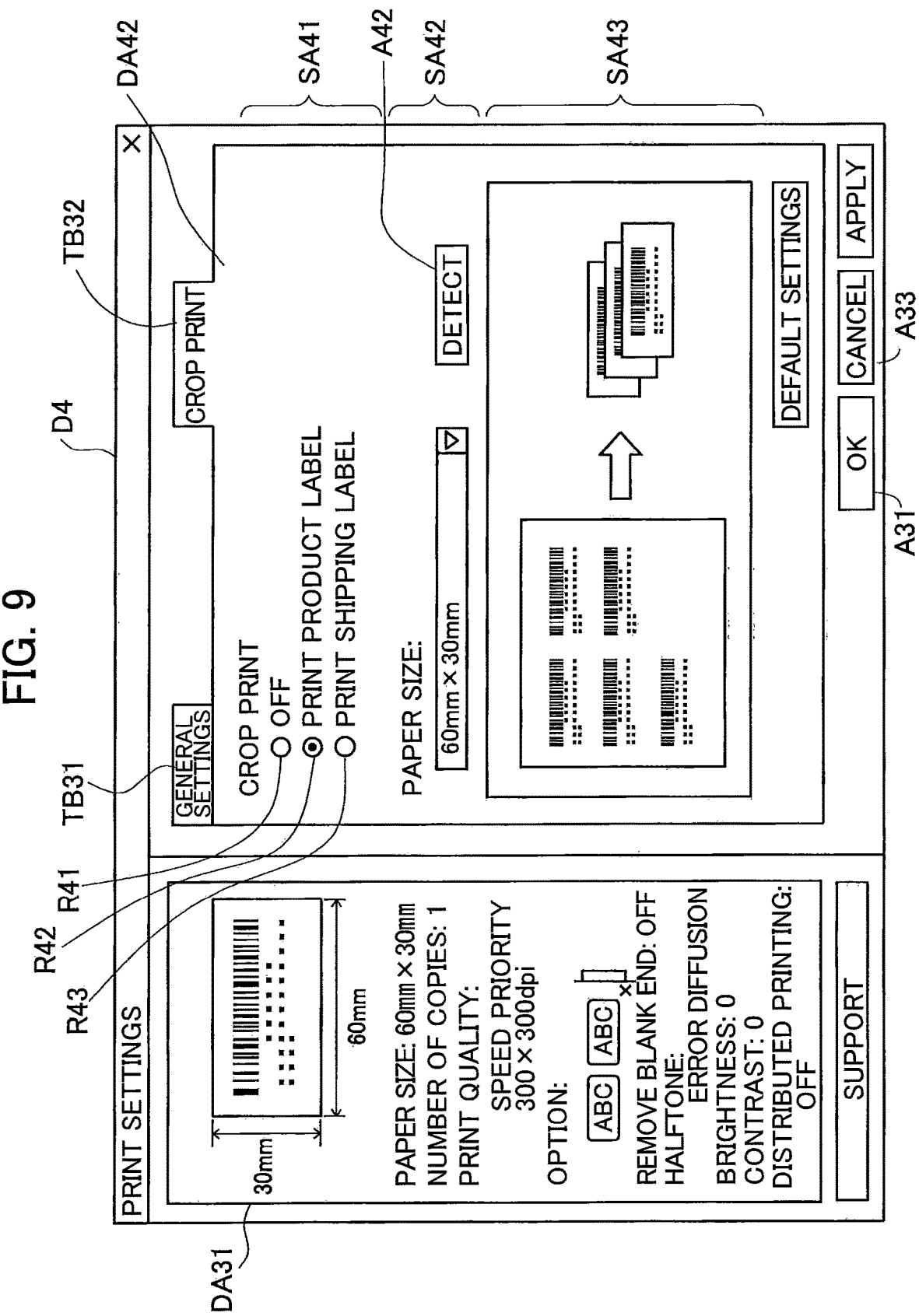
FIG. 9 is an explanatory diagram illustrating a crop print settings screen.

Next, the crop print settings screen D4 will be described with reference to FIG. 9. As shown in the example of FIG. 9, a crop print settings area DA42 is displayed in place of the general settings area DA32 of the general settings screen D3. The crop print settings area DA42 is provided with the crop settings section SA41 having the radio buttons R41-R43 for specifying a setting for crop print, a paper size section SA42 for selecting the paper size, and an image section SA43 for displaying an image illustrating overview of the crop print according to the setting in the crop settings section SA41. The crop print settings screen D4 is also provided with a Detect button A42. The Detect button A42 is an input object that receives an instruction to acquire the paper size from the printer 2.

In S16 the CPU 11 determines whether the Detect button A42 is pressed. However, the CPU 11 skips S16 when the general settings screen D3 is displayed since the Detect button A42 is not provided in the general settings screen D3. In other words, the process of S16 is performed only when the crop print settings screen D4 is displayed. When the general settings screen D3 is displayed, the CPU 11 skips S16 and advances to S36 to determine whether the selected tab has changed.

When the user selects the crop print tab TB32 in the general settings screen D3 using the user interface 18 (S36: YES), in S38 the CPU 11 changes the display 19 to display the crop print settings screen D4 and in S40 reflects the settings stored in the RAM 13 in the crop print settings screen D4.

Here, a description will be given for a case in which the user operates the crop print tab TB32 to switch the printer driver 411 to the crop print settings mode and subsequently uses the user interface 18 to select the Detect button A42 without modifying the crop settings (S42: NO, S48: NO, S16: YES). In S18 the CPU 11 acquires the paper size for the paper currently set in the printer 2. The process of S18 is an example of the acquisition process.

For the CPU 11 to acquire the paper size, the printer driver 411 may transmit a command to the printer 2 to measure the paper size, and the CPU 11 may receive the measurement results. The printer 2 may detect the paper size while executing a calibration or may detect the paper size from an identifier on the cassette housing the printing medium 22. Since the printer 2 actually measures or detects the paper size in this way, the PC 1 can automatically acquire the paper size for the printing medium 22 currently mounted in the printer 2.

Note that the paper size that the PC 1 acquires from the printer 2 is not limited to the paper size of the printing medium 22 currently mounted in the printer 2. That is, when the printer driver 411 requests the printer 2 to transmit the paper size of the printing medium 22 set in the printer 2, the printer 2 may respond with the paper size stored in a memory therein. The printer driver 411 may acquire the paper size by receiving this response from the printer 2. However, if the paper cassette is removed from the printer 2, a paper size corresponding to the cassette previously mounted in the printer 2 may be returned to the PC 1.

After acquiring the paper size, in S20 the CPU 11 determines whether a record 44 having this paper size is included in the registration database 42 (FIG. 4). In other words, the CPU 11 compares the acquired paper size to the paper sizes 442 stored in the records 44 of the registration database 42, and reads the paper size 442 closest to the acquired paper size. Subsequently, the CPU 11 determines whether the paper size 442 read from the registration database 42 is within a prescribed margin of error from the paper size acquired from the printer 2.

If the CPU 11 determines that the paper size 442 read from the registration database 42 is within the prescribed margin of error from the acquired paper size, the CPU 11 determines that a record 44 corresponding to the acquired paper size exists in the registration database 42 (S20: YES). In this case, in S22 the CPU 11 reads from the registration database 42 the record 44 that has the paper size 442 read in S20. Accordingly, the CPU 11 extracts the record 44 from the registration database 42 corresponding to the same paper size as the acquired paper size. The process in S20 and S22 is an example of the extraction process.

If the CPU 11 determines that the paper size 442 read from the registration database 42 is not within the prescribed margin of error from the acquired paper size, i.e., that a record corresponding to the acquired paper size does not exist (S20: NO), in S56 the CPU 11 executes a registration process to add a record for the acquired paper size to the registration database 42. After completing the registration process, the CPU 11 returns to S16. The registration process is an example of the storage process. The registration process will be described later.

In S24 the CPU 11 overwrites the print settings temporarily stored in the RAM 13 with the values set in the record 44 extracted from the registration database 42. Only setting items for which the record 44 has values are overwritten. Current values for all setting items not included in the extracted record 44 are left unchanged. The process of S24 is an example of the modification process.

In S26 the CPU 11 determines whether the mode can be identified from the print settings stored in the RAM 13. If the CPU 11 determines that the mode can be identified (S26: YES), in S28 the CPU 11 determines whether the mode matches the current mode of the printer driver 411. In a case where the current mode of the printer driver 411 is the crop print settings mode, the printer driver 411 displays the crop print settings screen D4. In other words, if the crop print settings screen D4 is currently displayed, the current mode is the crop print settings mode. On the other hand, in a case the current mode of the printer driver 411 is the general print settings mode on the display 19, the printer driver displays the general print settings screen D3 on the display 19. In other words, if the general print settings screen D3 is currently displayed, the current mode is the general print settings mode. If the mode cannot be identified in S26, the CPU 11 may display a screen to receive a user's desired mode. In this case, if the CPU 11 receives the user's desired mode, the CPU 11 registers the received mode as the mode 443 of the record 44 having the paper size 442 matching the acquired paper size, and make YES determination in S26 whereas if the CPU 11 cannot receive a user's desired mode by receiving operation of a cancel button on the screen, the CPU 11 make NO determination in S26. If in S20 the CPU 11 finds a plurality of records 443 having the paper size 442 matching the acquired paper size, the CPU 11 may display a mode selection screen for allowing the user to select one of the modes included in the found records 443. In this case, if a mode cannot be identified from one or more found records 443, the CPU 11 may further display on the mode selection screen having options enabling the user to input the user's desired mode, and store the received mode in the corresponding record 443. If the CPU 11 receives the user selected mode in the mode selection screen, in S22 the CPU 11 reads the record 443 having the user selected mode among the found modes.

If the paper size acquired from the printer 2 includes a paper width of 60 mm and a paper length of 30 mm, for example, the CPU 11 will extract the record 44 having record number "2" from the registration database 42 and will overwrite the settings in the RAM 13 with the values in the record 44 (S20: YES, S22, S24). Accordingly, the mode stored in the RAM 13 will become the crop print settings mode. Since the printer driver 411 is displaying the crop print settings screen D4 on the display 19, the current mode is the crop print settings mode.

Accordingly, since the CPU 11 determines that the mode can be identified from the settings in the RAM 13 and that this identified mode matches the current mode of the printer driver 411 (S26: YES, S28: YES), in S52 the CPU 11 performs an agreement notification. The agreement notification is a process for notifying the user of a message indicating that the paper currently loaded in the printer 2 corresponds to paper used for a crop print through a sound or a screen on the display 19.

In this case, in S54 the CPU 11 does not switch the printer driver 411 to the general print settings mode for maintaining the current settings screen to the crop print settings mode, and thus the current settings screen reflects the settings overwritten in the RAM 13 in S24 in the current settings screen. In a case where the settings in the RAM 13 is based on the record having record number "2", the value stored for the use setting in the RAM 13 is "product label". Accordingly, while the crop print settings screen D4 remains displayed on the display 19, the display of the crop settings section SA41 is shifted from a state in which the radio button R41 is selected to a state in which the radio button R42 is selected. Here, the radio button R42 indicates that a crop print is to be performed for a product label. Additionally, the display in paper size section SA42 is changed based on the paper size stored in the RAM 13.

If the paper size acquired from the printer 2 has a paper width of 105 mm and a paper length of 50 mm, the CPU 11 extracts the record 44 from the registration database 42 having record number "4" and overwrites settings in the RAM 13 with this record 44 (S20: YES, S22, S24). In this case, the CPU 11 maintains the display of the crop print settings screen D4, as when extracting the record 44 with record number "2". Since the use setting stored in the RAM 13 is "shipping label" in this case, the radio button R43 in the crop settings section SA41 is selected. The radio button R43 indicates that a crop print is to be performed for a shipping label.

Based on the selected states of the radio buttons R42 and R43, the user can infer whether the paper loaded in the printer 2 is suitable for printing a product label or a shipping label. For example, if the radio button R43 is currently selected while the user wishes to print a product label, it is expected that the user will replace the printing medium 22 currently set in the printer 2 with paper suited to product labels, thereby avoiding a failed print that would occur if the crop print were performed on the printing medium 22 set in the printer 2 which is inappropriate for the product label.

When the paper size acquired from the printer 2 has a paper width of 30 mm and a paper length of 60 mm, on the other hand, the CPU 11 extracts the record 44 from the registration database 42 having the record number "1" and overwrites the settings in the RAM 13 (S20: YES, S22, S24). Through this process, the mode stored in the RAM 13 becomes the general print settings mode. Since the printer driver 411 currently displays the crop print settings screen D4 on the display 19, the current mode is the crop print settings mode.

Figure 10:
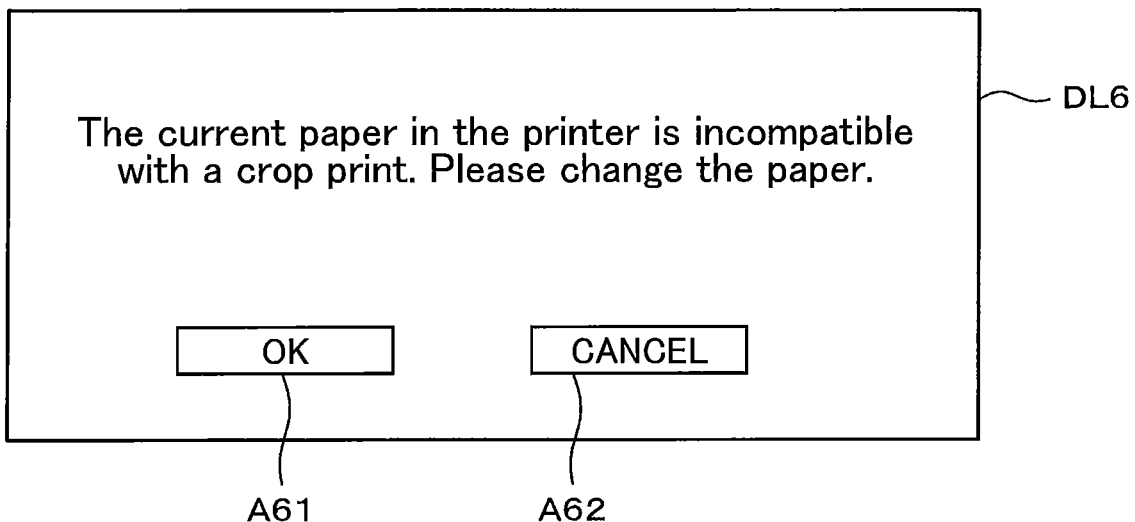
FIG. 10 is an explanatory diagram illustrating an error notification displayed on a display.

Accordingly, the CPU 11 determines that the mode in the RAM 13 does not match the current mode of the printer driver 411 (S26: YES, S28: NO), and in S30 the CPU 11 performs an error notification. The process of S30 is an example of the notification process. The error notification is a process for displaying a dialog DL6 on the display 19 as shown in FIG. 10. The dialog DL6 includes a paper-related message, such as "The current paper in the printer is incompatible with a crop print. Please change the paper." The dialog DL6 is also provided with icons A61 and A62 for receiving the user's decision of whether the user replaced the paper set in the printer 2. Alternatively, the error notification process may just include sound (sound message, or alarm sound, for example) and need not involve displaying an error message. The dialog DL6 may also display instructions guiding the user in replacing the paper size.

When the OK icon A61 or the Cancel icon A62 is operated, in S32 the CPU 11 determines whether the user replaced the paper. When the user replaced the paper in the printer 2, the user selects the OK icon A61 using the user interface 18. In this case, the CPU 11 determines in S32 of FIG. 7 that the user replaced the paper (S32: YES) and in S58 determines whether a notification has been received from the printer 2 indicating that paper replacement was complete. The CPU 11 waits while a notification indicating that paper replacement was complete has not been received (S58: NO). The CPU 11 returns to S16 upon receiving a paper replacement complete notification (S58: YES).

On the other hand, if the user does not replace the paper in the printer 2, the user selects the Cancel icon A62 using the user interface 18. In this case, the CPU 11 determines that the user does not replace the paper (S32: NO) and in S34 switches the settings screen. Since the crop print settings screen D4 is currently displayed on the screen, the CPU 11 switches the display to the general settings screen D3, thereby switching the printer driver 411 to the general print settings mode. By switching the screen in this way, the user can infer that the paper incompatible for crop printing is currently set in the printer 2. If the user wishes to print a product label, for example, it can be expected that the user will replace the paper currently set in the printer 2 with paper used for product labels. The process in S34 is an example of the switching process.

After displaying the general settings screen D3 or the crop print settings screen D4 as described above, in S36 the CPU 11 determines whether the tab selection was changed. Note that the process beginning from S36 is the same whether the general settings screen D3 is displayed or the crop print settings screen D4 is displayed. If the crop print tab TB32 was operated while the general settings screen D3 is displayed (S36: YES), the CPU 11 switches the display to the crop print settings screen D4 and reflects the settings stored in the RAM 13 in the crop print settings screen D4 (S38, S40). If the general print tab TB31 was operated while the crop print settings screen D4 is displayed (S36: YES), the CPU 11 switches the display to the general settings screen D3 and reflects the settings stored in the RAM 13 in the general settings screen D3 (S38, S40).

If the user interface 18 is operated while either the crop print settings screen D4 or general settings screen D3 is displayed, the CPU 11 determines that a modification operation was received (S36: NO, S42: YES). In this case, in S44 the CPU 11 changes the content in the displayed screen according to the modification operation and in S46 modifies the corresponding settings in the RAM 13.

When the user operates the user interface 18 to select the OK button A31 in the crop print settings screen D4 or the general settings screen D3 (S48: YES), in S50 the CPU 11 updates the current print settings stored in the registry by overwriting the settings with the print settings temporarily stored in the RAM 13. Subsequently, the CPU 11 ends the print settings process.

After the print settings process ends, the CPU 11 displays the print settings dialog DL1 shown in FIG. 6 on the display 19 according to the general application 40. If the user selects the Print button A3 in the print settings dialog DL1, the CPU 11 receives a print instruction and transmits A4-size image data from the general application 40 to the printer driver 411.

The CPU 11 reads the print settings from the registry and generates print data and commands. If the crop print setting is set to ON and the use setting is set to "product label" in the print settings for example, the CPU 11 extracts image data for an image 7 from the A4-size image data and generates print data. Using the printer driver 411, the CPU 11 generates image data so that the resulting print data will fit within the printing region of the paper size included in the print settings, and converts the print data to a format that the printer 2 can read. Next, the PC 1 outputs a print command including converted image data to the printer 2. The printer 2 proceeds to print the image 7 on a single printing paper 222 based on the print command. Note, when the use setting is "product label," the value "none" is set for auto-cut in the print command. Accordingly, the printer 2 does not cut the printing medium 22 after printing.

Therefore, if the record 44 associated with the paper size of the printing medium 22 currently mounted in the printer 2 stores a mode that does not match the current mode of the printer driver 411, the printer driver 411 notifies the user of information concerning the paper size. Through this operation, the user can infer that the paper loaded in the printer 2 is inappropriate. Accordingly, the printer driver 411 can prevent a product label or shipping label from being printed when an inappropriate paper size has been selected, thereby reducing the time and effort required by the user to walk over to the printer 2 in order to confirm the paper size.

As a specific example, when the Detect button A42 is operated in the crop print settings screen D4 and the record 44 having record number "1" is extracted from the registration database 42, the CPU 11 determines that the general print settings mode included as the mode 443 in the extracted record 44 does not match the current mode of the printer driver 411, i.e., the crop print settings mode. In this case, the CPU 11 switches the screen automatically to the general settings screen D3 (S16: YES, S18, S20: YES, S22, S24, S26: YES, S28: NO, S30, S32: NO, S34). If the user subsequently operates the crop print tab TB32 in the general settings screen D3 (S36: YES), the CPU 11 displays the crop print settings screen D4 with the radio button R41 selected. In this way, when the CPU 11 extracts a record 44 from the registration database 42 having the general print settings mode as the setting for the mode 443, the printer driver 411 does not execute a crop print as long as the user does not operate the crop print tab TB32. This process can reduce the potential for a crop print being performed while a paper unsuited to crop printing is set in the printer 2, thereby reducing the potential for failed crop prints.

Here, the paper size for non-genuine paper is not recorded in the registration database 42 unless the user has recorded the size. Therefore, when non-genuine paper is set in the printer 2, the CPU 11 may not be able to extract a record from the registration database 42 even after acquiring a paper size from the printer 2 (S20: NO). As a result, the CPU 11 executes a registration process in S56 and returns to S16.

Further, the mode 443 may not be identified as in the record 44 of FIG. 4 having record number "5". If the paper size acquired from the printer 2 includes a paper width of 50 mm and a paper length of 105 mm, matching the paper size associated with record number "5", the CPU 11 extracts the record 44 having record number "5", but cannot identify the mode (S26: NO) after overwriting the settings in the RAM 13 with the extracted record 44 (S20: YES, S22, S24). In this case, the CPU 11 executes the registration process in S56 and returns to S16. The registration process is an example of the first storage process and the second storage process.

Figure 11A:
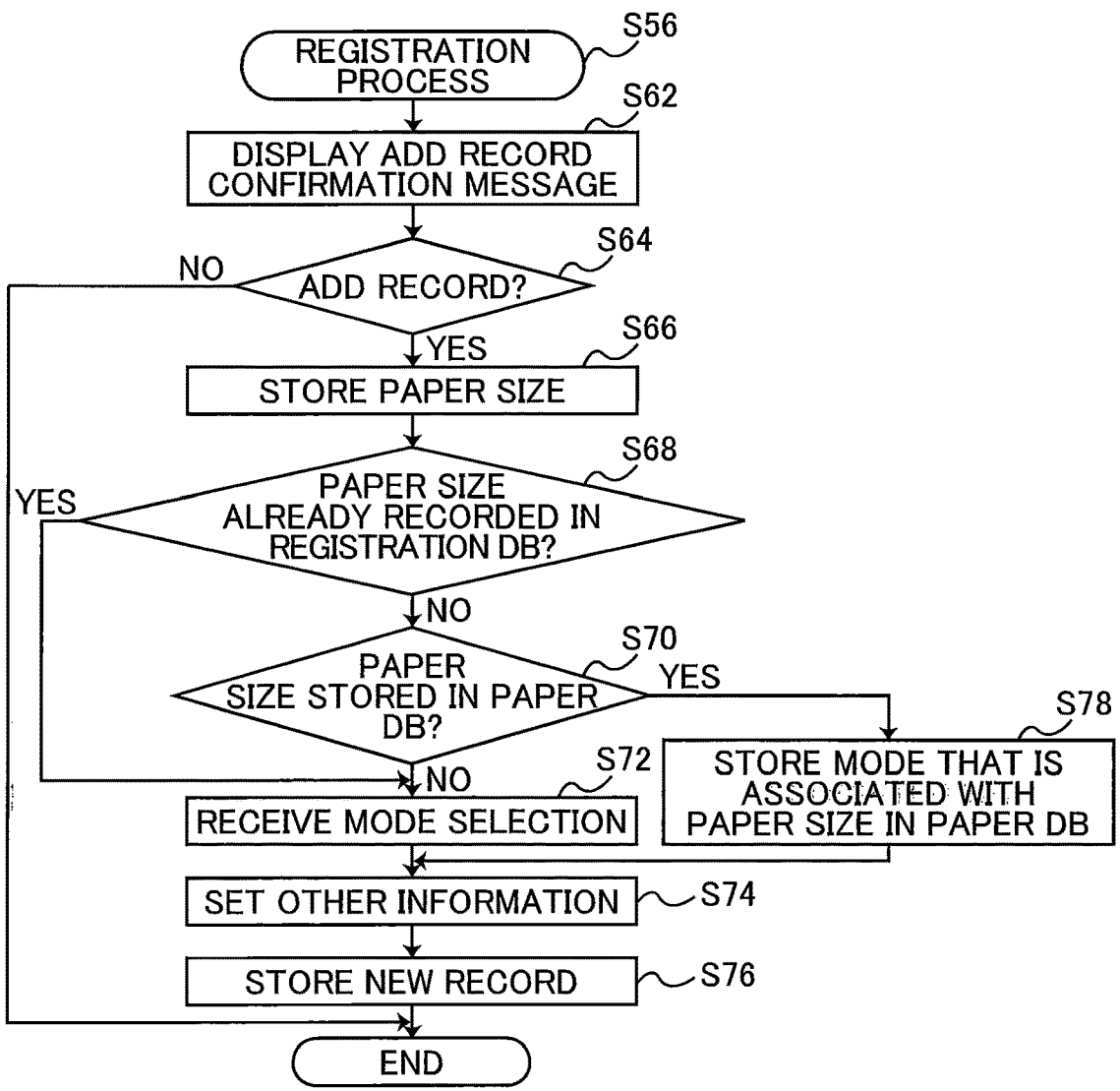
FIG. 11(*a*) is a flowchart illustrating a registration process.
Figure 11B:
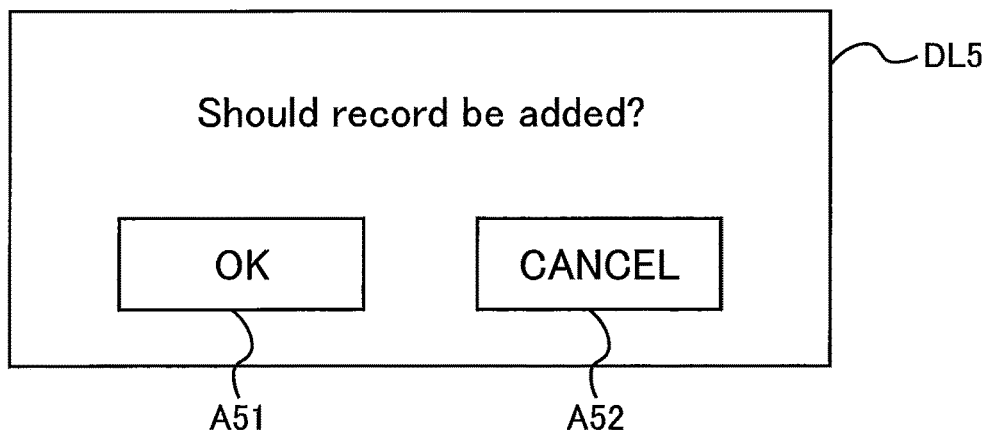

Next, the registration process will be described with reference to FIGS. 11(a) and 11(b). As shown in FIG. 11(a), in S62 the CPU 11 displays an add record confirmation message on the display 19. FIG. 11(b) shows an example of a dialog DL5 that the CPU 11 displays on the display 19. The dialog DL5 includes a message for confirming whether to add the settings, an OK icon A51 indicating that the record should be added, and a Cancel icon A52 indicating that the record should not be added. In S64 the CPU 11 determines whether a command to add a record was received based on operations of the icons A51 and A52.

If the Cancel icon A52 was operated via the user interface 18, the CPU 11 determines that an instruction to add a record was not received (S64: NO), and ends the registration process. However, if the OK icon A51 was selected via the user interface 18, the CPU 11 determines that an instruction to add a record was received (S64: YES). In S66 the CPU 11 stores the paper size, which is acquired from the printer 2 in S18, in the RAM 13. In S68 the CPU 11 determines whether the paper size acquired from the printer 2 is already recorded in the registration database 42.

For example, if the paper size acquired from the printer 2 has a paper width of 90 mm and a paper length of 105 mm, in S68 the CPU 11 determines that the paper size has not been recorded in the registration database 42 shown in FIG. 4 (S68: NO). In this case, in S70 the CPU 11 determines whether the paper size acquired from the printer 2 is stored in the paper database 45 shown in FIG. 5. Using the example of FIG. 5, the CPU 11 determines that the paper size of 90 mm width and 105 mm length is stored in the paper database 45 (S70: YES). In this case, in S78 the CPU 11 stores the mode, which is associated with the paper size in the paper database 45 and is the crop print settings mode in this case, in the RAM 13 and subsequently advances to S74.

As another example, if the paper size acquired from the printer 2 has a paper width of 60 mm and a paper length of 45 mm, the paper size is not recorded in the registration database 42 but is recorded in the paper database 45 (S68: NO, S70: YES). In this case, the CPU 11 stores the general print settings mode provided in the paper database 45 in association with this paper size in the RAM 13 and advances to S74.

However, if a non-genuine paper is set in the printer 2 and the paper size acquired from the printer 2 has a paper width of 200 mm, the paper size is not recorded in the registration database 42 or the paper database 45 (S68: NO, S70: NO). Accordingly, in S72 the CPU 11 receives a mode selected through the user interface 18 and advances to S74.

As another example, if the paper size acquired from the printer 2 has a paper width of 50 mm and a paper length of 105 mm, the CPU 11 determines in S68 that the paper size is recorded in the registration database 42 based on the record 44 shown in FIG. 4 having the record number "5" (S68: YES). In this example, the record 44 having record number "5" does not include a value set in the mode 443. Therefore, in S72 the CPU 11 receives a user-selected mode via the user interface 18 and advances to S74.

In S74 the CPU 11 sets information on settings other than the paper size and mode and in S76 stores a record associating this other information with the paper size acquired in S18 and the mode received S72 or S78 in the registration database 42, thereby adding a new record. In the embodiment, the mode to be registered in the record is set based on a user selection or the paper database 45 (S72, S78). However, the mode may be set to the mode currently set for the printer driver 411 or to a default mode in the registration process. After completing the registration process shown in FIG. 11(a), the CPU 11 returns to S16 in FIG. 7. In S74 the CPU 11 may display a screen to receive user selections with respect to the information other than the paper size and mode, and set the received selections as the other information.

Hence, when the printer driver 411 of the embodiment detects that the paper size acquired from the printer 2 is a new size not recorded in the registration database 42, the printer driver 411 can record this paper size in the registration database 42 so that the appropriate error notification or agreement notification can be performed for this paper size in subsequent cases. Additionally, if the printer driver 411 detects that the paper size acquired from the printer 2 is already recorded in the registration database 42 but does not have an identified mode, the printer driver 411 can store a new record in the registration database 42 as the record corresponding to this paper size from which the mode can be identified, so that the printer driver 411 can perform a suitable error notification or agreement notification for this paper size in subsequent cases.

While the disclosure has been described in detail with reference to the first embodiment thereof, it would be apparent to those skilled in the art that many modifications and variations may be made therein. For example, the numbers of PCs and printers are not limited to the example in the drawings. Further, the printing method of the printer 2 is not limited to the thermal transfer method, but may be an inkjet method, an electrophotographic method, or a direct thermal method, for example. Further, the printing medium 22 is not limited to labels, but may be a simple paper roll, for example. Additionally, the crop print settings mode may be a mode for adjusting print settings when printing medication labels for personal health records.

The present disclosure may also be applied to a paper roll printer for printing on rolls of paper, or a cut paper printer for printing on pre-cut sheets. The present disclosure may also be applied to a multifunction peripheral provided with a scanning function in addition to the printing function.

Switching between the general print settings mode and the crop print settings mode may be achieved by changing what setting items can be inputted, rather than switching screens. For example, during the general print settings mode, standard setting items are selectably displayed, while crop print setting items are non-selectably displayed. During the crop print settings mode, crop print setting items are selectably displayed, while print setting items not used in a crop print may be non-selectably displayed. This method can also show the user what can and cannot be inputted when modes are switched.

The printer driver 411 may be programmed to start up in the crop print settings mode at the start of the print settings process. In this case, step S14 may be omitted. Further, the process shown in S16 may be omitted and the CPU 11 may automatically acquire the paper size from the printer 2. When automatic detection of the paper size is made mandatory, the Detect button A42 may be omitted from the crop print settings screen D4. Further, when the paper size is automatically detected, automatic detection of the paper size may be performed on start-up according to an option setting. That is, if automatic detection has been selected in the option settings, the Detect button A42 is not displayed or displayed in a grayed-out state so that the user cannot select the Detect button A42. However, in a case where the Detect button A42 is selectably displayed in the crop print settings mode, the paper size is acquired when the Detect button A42 is operated to prevent failed crop prints.

The process shown in S34 of FIG. 7 may also be omitted. The processes in S68, S70, and S72 and S78 of FIG. 11(a) may also be omitted. In this case, the mode may be set to the mode currently set for the printer driver 411 or to a default mode in the registration process. However, by allowing the user to select a mode for each paper size, as in the process of S72, records suited to the user's needs can be stored in the registration database 42. Additionally, performing the process in S78 can reduce the user's time and effort to input modes. Alternatively, S68 and S70 may be omitted and one of S72 and S78 may be executed after S66. In this case, if S78 is starts after S66 but the mode is not associated with the paper size in the paper database 45, the mode may be set to the mode currently set for the printer driver 411 or to a default mode in the registration process.

The printer driver 411 of the embodiment has a function for recording a record in the registration database 42 by performing the registration process in S56 of FIG. 7. However, the registration process for entering records in the registration database 42 need not be limited to the process according to the printer driver 411. For example, an application may be provided for entering records in the registration database 42. In this case, the registration application exists outside the control of the OS 41 and performs the registration process independently from the printer driver 411. The registration application is started at a user-preferred timing or is launched by the printer driver 411 when the printer driver 411 determines in S20 of FIG. 7 that no record corresponding to the acquired paper size exists, or determines in S26 that the mode cannot be identified from the print settings stored in the RAM 13. The registration application is an example of the storing program. The printer driver 411 is an example of the setting program.

The registration process of S56 may also be omitted, or may be executed after the process in S50. Further, a record corresponding to an unregistered paper size or a record that does not identify a mode may be newly recorded in the registration database 42 through user operations. In other words, when adding a record 44, the user is prompted to input the paper size and mode, for example. Subsequently, the printer driver 411 receives a registration instruction, the printer driver 411 may record the new record in the registration database 42. This process is an example of the third storage process. Enabling the user to manually input records 44 improves user-friendliness by avoiding cases in which the user unintentionally stores a record 44 in the registration database 42.

In the error notification of S30, the user may simply be notified that the modes do not agree, rather than displaying a message specifying that the paper size is incompatible with the current mode. However, the user can be expected to switch paper when notified that the paper size is incompatible with the current mode.

The process in S24 may also be omitted. However, executing the process in S24 can eliminate the time and effort required by the user to modify the print settings.

In S28 the mode stored in the RAM 13 may be determined to be the crop print settings mode when the use setting in the RAM 13 is either "product label" or "shipping label," and may be determined to be the general print settings mode when the use setting in the RAM 13 is not one of the "product label" or "shipping label," and this mode may be compared with the current mode. In this case, the mode 443 may be omitted from the registration database 42.

The general settings screen D3 and the crop print settings screen D4 may include further tabs "Advanced settings" and "Other settings," and the print settings may include values for these settings.

In the embodiment, the CPU 11 acquired a paper size from the printer 2 that includes the width and length of the printing medium 22, but the CPU 11 may acquire a paper size that only includes the width.

The Detect button A42 may also be provided in the general settings screen D3, and the process beginning from S16 in FIG. 7 may be executed immediately after displaying the general settings screen D3. Hence, if the Detect button A42 is operated in the general settings screen D3 (S16: YES), the CPU 11 may switch the screen to the crop print settings screen D4 in S34 when the mode 443 of the record 44 extracted from the registration database 42 does not match the current mode of the printer driver 411 (S28: NO). If the mode 443 in the record 44 extracted from the registration database 42 does match the current mode of the printer driver 411 (S28: YES), in S54 the CPU 11 may continue displaying the general settings screen D3 while reflecting setting values that were stored in the RAM 13 in S24 in the general settings screen D3.

In any of the flowcharts disclosed in the embodiment, the plurality of processes that make up any of a plurality of steps may be executed in parallel, or the order in which the processes are performed may be modified in any way that does not produce any inconsistencies in the processes.

The processes in the embodiment may be performed one or more CPUs, hardware such as ASIC, or combination thereof. The process in the embodiment may be implemented by a computer readable recording medium storing a program for the processes or by a method for the processes.

Next, an information processing apparatus according to a second embodiment will be described. The PC 1 according to the second embodiment has the same structure as the PC 1 in the first embodiment, and only a print settings process is different from the print settings process shown in FIG. 7. In the following description, like parts and components to those in the first embodiment are designated with the same reference numerals and like process steps are designated with the same step numbers to avoid duplicating description.

Figure 12:
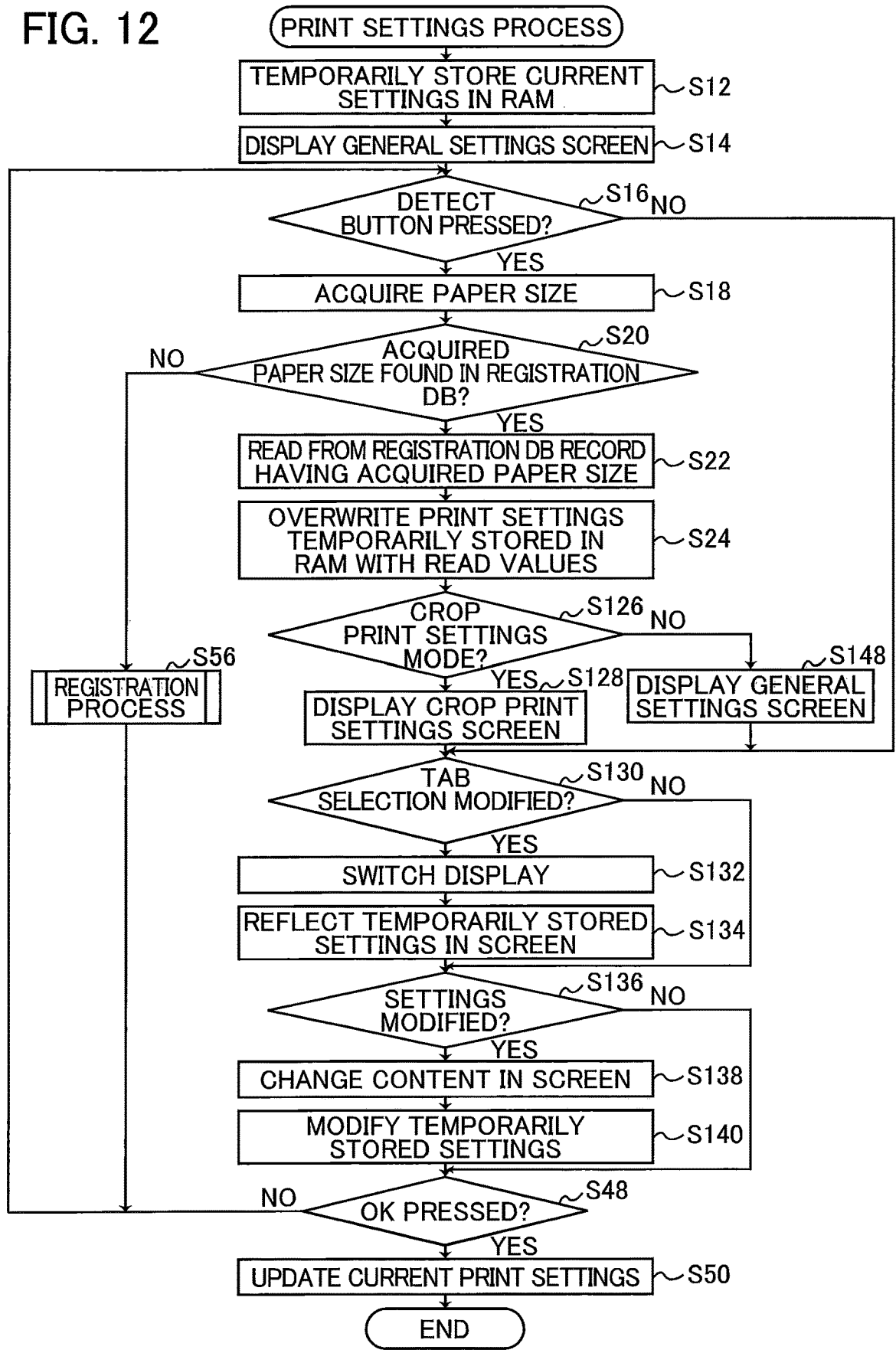
FIG. 12 is a flowchart illustrating a print settings process according to a second embodiment.
Figure 13:
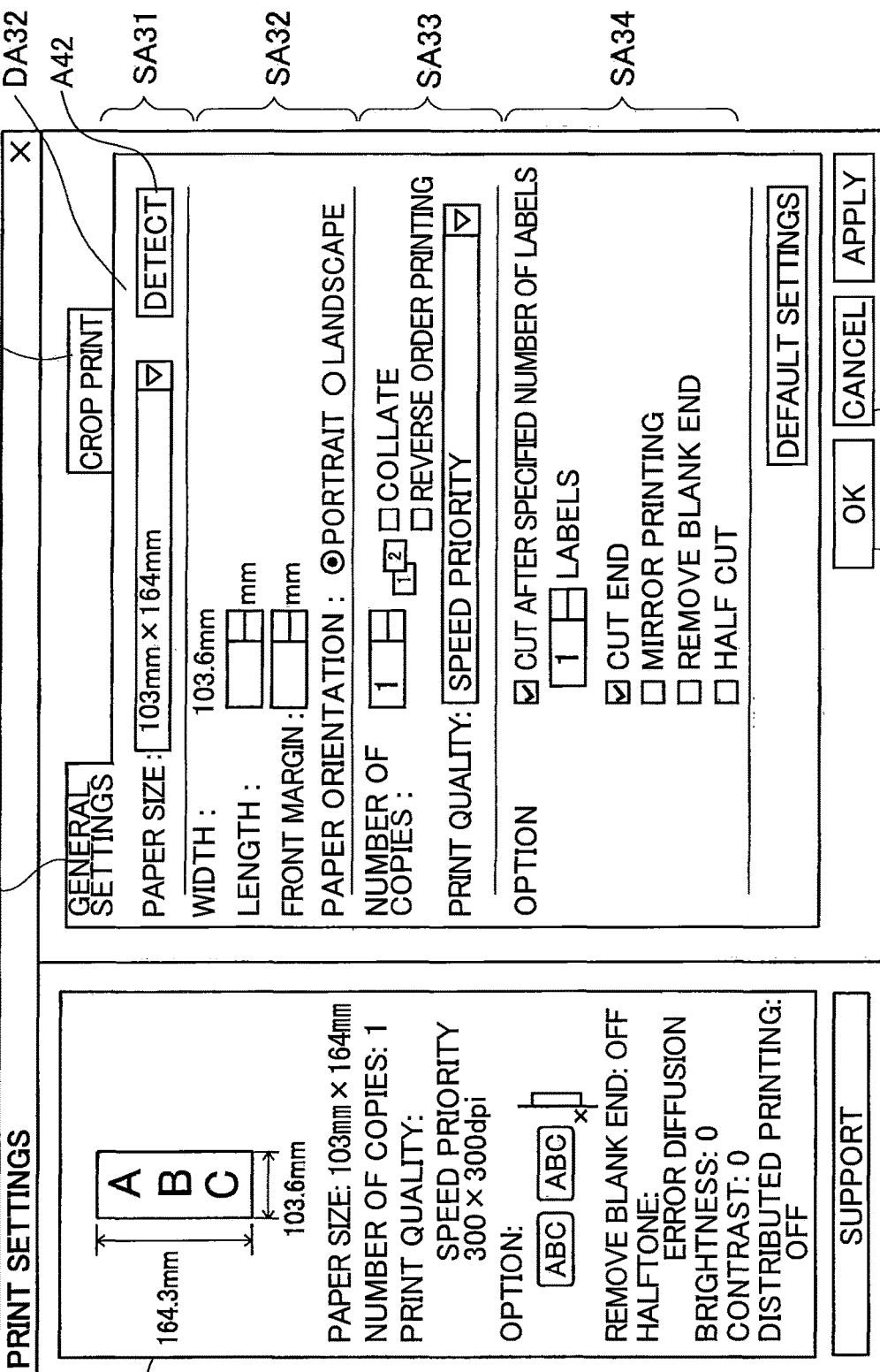
FIG. 13 is an explanatory diagram illustrating a general settings screen.

FIG. 12 is a flowchart illustrating the print settings process according to the second embodiment. Steps S12 and S14 are the same as those of the first embodiment, except that in S14 a general settings screen D3 shown in FIG. 13 is displayed on the display 19 in the second embodiment. In the general settings screen D3 shown in FIG. 13, the paper selection section SA31 further includes a Detect button A42 as shown in FIG. 13. The Detect button A42 is the same as the Detect button A42 shown in FIG. 9, and thus is an input object that receives an instruction to acquire the paper size from the printer 2. Remaining configuration of the general settings screen D3 shown in FIG. 13 is the same as the general setting screen D3 shown in FIG. 8. The crop print settings screen D4 of the second embodiment is the same as the first embodiment.

As an example, it will be assumed that the print settings stored in the registry include "continuous-length tape" for the paper type, a paper width of 103 mm and a paper length of 164 mm for the paper size, "Cut" as the value for the auto-cut option, and "Off" as the value for the crop print option. When the general settings screen D3 is displayed immediately after starting the print settings process, these settings are reflected in the settings display area DA31, the paper selection section SA31, the paper size section SA32, and the option section SA34, as illustrated in FIG. 13. When the crop print tab TB32 is selected in the general settings screen D3, the CPU 11 displays the crop print settings screen D4 shown in FIG. 8 with the radio button R41 selected. The radio button R41 indicates that a crop print will not be performed. Further, the CPU 11 displays the same paper size displayed in the general settings screen D3 in the paper size section SA42 and displays the image for a general print in the image section SA43.

Returning to FIG. 12, the process of S16 is common to both cases in which the general settings screen D3 is displayed and cases in which the crop print settings screen D4 is displayed because both of the general settings screen D3 and the crop print settings screen include the Detect button A42 in the second embodiment. In S16 the CPU 11 determines whether the Detect button A42 was operated via the user interface 18. If the CPU 11 determines that the Detect button A42 was operated (S16: YES), in S18 the CPU 11 acquires the paper size for the paper currently set in the printer 2.

Subsequently to S24, in S126 the CPU 11 determines whether the mode included in the print settings stored in the RAM 13 is "crop print settings mode." If the mode is "crop print settings mode" (S126: YES), in S128 the CPU 11 displays the crop print settings screen D4 shown in FIG. 8. In other words, the CPU 11 switches the display to the crop print settings screen D4 when the general settings screen D3 is currently being displayed or continues displaying the crop print settings screen D4 when the crop print settings screen D4 is currently being displayed. At this time, the print settings stored in the RAM 13, i.e., the values for print settings specified in the extracted record, are reflected in the crop print settings screen D4. The process of S128 is an example of the display process. The process of S126 and S128 performed while the general settings screen D3 is displayed is an example of the switching process.

If the paper size acquired from the printer 2 in S18 has a paper width of 60 mm and a paper length of 30 mm while the general settings screen D3 is currently being displayed, for example, the CPU 11 extracts the record 44 having record number "2" having the paper size 442 matching the paper size acquired in S18 from the registration database 42 shown in FIG. 4 (S20: YES, S22). The record having record number "2" has values set for the paper size 442, mode 443, use 444, paper type 445, and auto-cut option 446, for example. Therefore, in S24 the CPU 11 modifies the values of print settings stored in the RAM 13 for paper size, mode, use, paper type, and auto-cut option to the values included in the record 44 having record number "2".

In this case, the mode included in the print settings stored in the RAM 13 is set to "crop print settings mode" by the mode 443 in the record 44 having record number "2". Hence, the CPU 11 switches the display from the general settings screen D3 shown in FIG. 13 to the crop print settings screen D4 shown in FIG. 8 (S126: YES, S128). At this time, the CPU 11 reflects the values from record 44 having record number "2" in the crop print settings screen D4.

In this case, the use and paper size settings stored in the RAM 13 are set to "Product label" and "60 mm×30 mm" by the respective use 444 and paper size 442 in the record 44 having record number "2" that was extracted from the registration database 42 shown in FIG. 4. Hence, the CPU 11 automatically selects the radio button R42 in the crop settings section SA41 to specify a crop print for a product label, and displays "60 mm×30 mm" in the paper size section SA42. Additionally, the CPU 11 displays an image in the image section SA43 illustrating the crop print of the product label. The CPU 11 also changes the print settings displayed in the settings display area DA31 to reflect the values specified by the record 44 having record number "2". Before the Detect button A42 is operated, a schematic diagram for printing a continuous-length tape is displayed in the settings display area DA31. After the Detect button A42 is operated, the display is switched to the crop print settings screen D4 while a schematic diagram for printing a die-cut label is displayed in the settings display area DA31 to correspond with the paper type 445 in the record 44 having record number "2". The paper size is similarly modified. Values for settings in the RAM 13 for items not included in the record 44 having record number "2" are left unchanged in the display.

Returning to FIG. 12, in S130 the CPU 11 determines whether the tab selection was modified via the user interface 18. If the tab selection was not modified (S130: NO), the CPU 11 advances to S136.

On the other hand, if the general print tab TB31 was selected in the crop print settings screen D4, or if the crop print tab TB32 was selected in the general settings screen D3, the CPU 11 determines that the tab selection was modified (S130: YES). In this case, the CPU 11 switches the setting screen. Specifically, in S132 the CPU 11 switches the display from the crop print settings screen D4 to the general settings screen D3 or from the general settings screen D3 to the crop print settings screen D4. In S134 the CPU 11 reflects the print settings temporarily stored in the RAM 13 in the general settings screen D3 or the crop print settings screen D4.

As an example, the CPU 11 extracts the record 44 having record number "2" from the registration database 42 shown in FIG. 4, overwrites the print settings in the RAM 13 with the values in the extracted record 44, and displays the crop print settings screen D4 (S24, S126: YES, S128). If the user performs an operation to select the general print tab TB31 in the crop print settings screen D4, the CPU 11 switches the screen to the general settings screen D3 (S130: YES, S132). Since the print settings stored in the RAM 13 have "None" as the auto-cut setting in this case, checks are automatically removed from checkboxes in the option section SA34 next to "Cut after specified number of labels," "Cut end," and "Half cut." In S134 values reflecting print settings indicated in the record 44 having record number "2" are similarly displayed in the paper selection section SA31, paper size section SA32, and settings display area DA31.

Conversely, when the crop print tab TB32 is operated in the general settings screen D3 (S130: YES), in S132 the CPU 11 displays the crop print settings screen D4 and in S134 reflects the settings stored in the RAM 13 in the crop print settings screen D4. Accordingly, by selecting the general print tab TB31 in the crop print settings screen D4 or the crop print tab TB32 in the general settings screen D3 via the user interface 18, the user can switch modes of the printer driver 411 as desired (S130: YES, S132, S134).

As shown in FIG. 12, in S136 the CPU 11 determines whether the user performed an operation using the user interface 18 to modify settings in the crop print settings screen D4 or the general settings screen D3 displayed on the display 19. If the CPU 11 determines that a modification operation was performed (S136: YES), in S138 the CPU 11 changes the content displayed in the crop print settings screen D4 or the general settings screen D3 according to the modification operation. In S140 the CPU 11 modifies the print settings temporarily stored in the RAM 13 according to the user-modified setting. If the CPU 11 determines in S136 that no modification operation was performed (S136: NO), the CPU 11 advances to S48 without performing the process in S138 and S140.

In S48 the CPU 11 determines whether the OK button A31 in the crop print settings screen D4 or the general settings screen D3 was operated via the user interface 18. If the OK button A31 was not operated (S48: NO), the CPU 11 returns to S16.

However, if the OK button A31 was operated (S48: YES), in S50 the CPU 11 updates the current print settings stored in the registry by overwriting the settings with the print settings temporarily stored in the RAM 13. Subsequently, the CPU 11 ends the print settings process.

After the print settings process performed with the printer driver 411 ends, the CPU 11 displays the print settings dialog DL1 (FIG. 6) on the display 19 according to the general application 40. If the user selects the Print button A3 in the print settings dialog DL1, the CPU 11 receives a print instruction and passes A4-size image data from the general application 40 to the printer driver 411.

The CPU 11 reads the print settings from the registry and generates print data and commands. If the crop print setting is set to ON and the use setting is set to "product label" in the print settings for example, the CPU 11 extracts image data for each image 7 from the A4-size image data and generates print data. Using the printer driver 411, the CPU 11 generates image data so that the resulting print data will fit within the printing region of the paper size included in the print settings, and converts the print data to a format that the printer 2 can read. Next, the PC 1 outputs a print command including the converted sets of image data to the printer 2. The printer 2 proceeds to print each image 7 on a single printing paper 222 based on the print command. Note, when the use setting is "product label," the value "none" is set for auto-cut in the print command. Accordingly, the printer 2 does not cut the printing medium 22 after printing.

If the paper size acquired from the printer 2 a paper width of 105 mm and a paper length of 50 mm in response to operation of the Detect button A42, for example, the CPU 11 will extract the record 44 having record number "4" from the registration database 42 and will overwrite the print settings temporarily stored in the RAM 13 with the values in the extracted record 44 (S16: YES, S18, S20: YES, S22, S24). Here, the CPU 11 displays the crop print settings screen D4 since the print setting for mode in the RAM 13 is set to "crop print settings mode" based on the mode 443 in the extracted record 44 (S126: YES, S128). In this case, the CPU 11 automatically selects the radio button R43 when displaying the crop print settings screen D4 based on the use 444, indicating that a crop print is to be performed for a shipping label. The CPU 11 displays remaining information on the crop print settings screen D4 similarly to a case where a crop print is to be performed for a product label.

On the other hand, if the paper size acquired from the printer 2 in S18 has a paper width of 30 mm and a paper length of 60 mm while displaying the general settings screen D3, for example, the CPU 11 will extract the record 44 having record number "1" from the registration database 42 shown in FIG. 4 (S20: YES, S22). In S24 the CPU 11 changes the print settings stored in the RAM 13 for paper size, mode, use, paper type, and auto-cut option to the settings in the record 44 having record number "1". In S148 the CPU 11 displays the general settings screen D3 since the mode setting stored in the RAM 13 is "basic print settings mode." At this time, the settings in the RAM 13 are displayed in the general settings screen D3. In other words, the CPU 11 displays values of print settings specified by the record 44 having record number "1" in the general settings screen D3. The process of S48 is an example of the display process.

Hence, the CPU 11 continues to display the general settings screen D3 while changing values related to paper size displayed in the settings display area DA31, paper selection section SA31, and paper size section SA32 based on the paper width of 30 mm and paper length of 60 mm indicated by the paper size in record number "1". Additionally, based on the setting for the paper type 445 of record number "1", the print schematic diagram displayed in the settings display area DA31 is changed from a schematic diagram for printing a continuous-length tape to a schematic diagram for printing pre-marked media. Further, based on the setting for the auto-cut option 446 in record number "1", a check is automatically removed from the checkbox next to "Cut end" in the option section SA34, and a check is automatically inserted into the checkbox next to "Half cut."

Returning to FIG. 12, after displaying the crop print settings screen D4 or the general settings screen D3 as described above, the CPU 11 advances to S130. Since the process from S130 has already been described in detail, a description of this process will not be repeated here.

Hence, when one of the records 44 recorded in the registration database 42 includes the paper size matching the paper size of the printing medium 22 currently set in the printer 2 (S18, S20: YES), the printer driver 411 displays the print settings specified by this record 44 on the display 19 (S22, S24, S126, S128, S148). In this way, the user can easily confirm the paper size, and thus there is a high probability that printing can be avoided while an inappropriate paper size is selected. This process also reduces the user's time and effort for inputting settings corresponding to the mode.

One or more steps illustrated in the first embodiment, the modification, and the second embodiment may be combined in any way that does not produce any inconsistencies.

What is claimed is:

1. A non-transitory computer readable storage medium storing a set of program instructions installed on and configured to be executed by a computer included in an information processing apparatus, the information processing apparatus further including a communication interface and a memory, the set of program instructions, when executed by the computer, causing the information processing apparatus to access a plurality of sets of setting data for printing by a printer, the plurality of sets of setting data being pre-stored in the memory, each set of setting data having sheet size data indicating a sheet size, each set of setting data being in association with setting mode data indicating a setting mode set to one of a plurality of setting modes for a setting process, the setting process setting a set of setting data to be used for printing by the printer, the plurality of setting modes including a first setting mode and a second setting mode different from the first setting mode, wherein the setting process in the first setting mode sets a set of setting data for a specific print whereas the setting process in the second setting mode sets a set of setting data used generally for printing, the set of program instructions, when executed by the computer, causing the information processing apparatus to perform:

executing the setting process in a current setting mode, the current setting mode being one of the first setting mode and the second setting mode;

acquiring from the printer a sheet size currently set in the printer via the communication interface;

extracting from the memory a set of setting data having sheet size data indicating a sheet size matching the acquired sheet size; and notifying information concerning a sheet size in a case where the extracting is executed successfully and setting mode data in association with the extracted set of setting data indicates a setting mode different from the current setting mode.

2. The non-transitory computer readable storage medium according to claim 1, wherein the acquiring includes:

transmitting a measurement instruction to the printer, the measurement instruction prompting the printer to measure the sheet size currently set therein and to transmit the measured sheet size to the information processing apparatus; and receiving the measured sheet size as the acquired sheet size from the printer.

3. The non-transitory computer readable storage medium according to claim 1, wherein the set of program instructions, when executed by the computer, causes the information processing apparatus to further perform receiving an instruction to acquire the sheet size, the acquiring being executed in a case where the receiving is executed while the current setting mode is set to the first setting mode, wherein the notifying is executed in a case where the extracting is executed successfully and the setting mode data in association with the extracted set of setting data indicates a setting mode different from the first setting mode.

4. The non-transitory computer readable storage medium according to claim 1, wherein the specific print is a crop print in which a partial image is extracted from an original image and printed, wherein the setting process in the first setting mode sets setting for the crop print.

5. The non-transitory computer readable storage medium according to claim 1, wherein the set of program instructions, when executed by the computer, causes the information processing apparatus to further perform switching the current setting mode to a setting mode matching the acquired setting mode in a case where the extracting is executed successfully, the setting mode data in association with the extracted set of setting data indicates a setting mode different from the first setting mode, and the plurality of setting modes includes a setting mode matching the acquired setting mode.

6. The non-transitory computer readable storage medium according to claim 1, wherein the information processing apparatus further includes a display, wherein the notifying includes displaying on the display information indicating that the sheet currently set in the printer does not match the current setting mode.

7. The non-transitory computer readable storage medium according to claim 1, wherein the set of program instructions, when executed by the computer, causes the information processing apparatus to further perform registering in the memory a new set of setting data having sheet size data indicating the acquired sheet size in a case where no set of setting data having a sheet size matching the acquired sheet size is acquired in the extracting.

8. The non-transitory computer readable storage medium according to claim 7, wherein the registering registers in the memory the new set of setting data in association with setting mode data indicating the first setting mode in a case where the acquired sheet size is supported by the first setting mode whereas the registering registers in the memory the new set of setting data in association with setting mode data indicating the second setting mode in a case where the acquired sheet size is supported by the second setting mode.

9. The non-transitory computer readable storage medium according to claim 1, wherein the set of program instructions, when executed by the computer, causes the information processing apparatus to further perform registering in the memory setting mode data in association with a new set of setting data having sheet size data matching acquired sheet size in a case where a set of setting data having sheet size data indicating a sheet size matching the acquired sheet size is extracted in the extracting but setting mode data is not associated with the extracted set of setting data.

10. The non-transitory computer readable storage medium according to claim 9, wherein the registering includes:

receiving a setting mode selected from the first setting mode and the second setting mode; and associating in the memory setting mode data indicating the selected setting mode with the set of setting data having sheet size data matching acquired sheet size.

11. The non-transitory computer readable storage medium according to claim 1, wherein in a case where the set of setting data which is currently selected in the setting process as a set of setting data to be used for printing by the printer is different from the extracted set of setting data, the setting process changes the set of setting data to be used for printing by the printer from the currently-selected set of setting data to the extracted set of setting data.

12. The non-transitory computer readable storage medium according to claim 1, wherein the set of program instructions, when executed by the computer, causes the information processing apparatus to further perform:

acquiring a setting mode; and registering in the memory a new set of setting data having sheet size data indicating the acquired sheet size in association with setting mode data indicating the acquired setting mode.

13. A non-transitory computer readable storage medium storing a set of program instructions installed on and configured to be executed by a computer included in an information processing apparatus, the information processing apparatus further including a communication interface and a memory, the set of program instructions, when executed by the computer, causing the information processing apparatus to access a plurality of sets of setting data for printing by a printer, the plurality of sets of setting data being pre-stored in the memory, each set of setting data having sheet size data indicating a sheet size, each set of setting data being in association with setting mode data indicating a setting mode set to one of a plurality of setting modes for a setting process, the setting process setting a set of setting data to be used for printing by the printer, the plurality of setting modes including a first setting mode and a second setting mode different from the first setting mode, wherein the setting process in the first setting mode sets a set of setting data for a specific print whereas the setting process in the second setting mode sets a set of setting data used generally for printing, the set of program instructions, when executed by the computer, causing the information processing apparatus to perform:

acquiring a set of setting data including a sheet size and a setting mode; and registering in the memory the acquired set of setting data and the acquired setting mode in association with each other, wherein the information processing apparatus is configured to perform: executing the setting process in a current setting mode, the current setting mode being one of the first setting mode and the second setting mode; acquiring from the printer a sheet size currently set in the printer via the communication interface; extracting from the memory a set of setting data having sheet size data indicating a sheet size matching the acquired sheet size; and notifying information concerning a sheet size in a case where the extracting is executed successfully and setting mode data in association with the extracted set of setting data indicates a setting mode different from the current setting mode.

14. A non-transitory computer readable storage medium storing a set of program instructions installed on and executed by a computer included in an information processing apparatus, the information processing apparatus further including a communication interface and a memory, the set of program instructions, when executed by the computer, causing the information processing apparatus to access a plurality of sets of setting data for printing by a printer, the plurality of sets of setting data being pre-stored in the memory, each set of setting data having sheet size data indicating a sheet size, each set of setting data being in association with setting mode data indicating a setting mode set to one of a plurality of setting modes for a setting process, the setting process setting a set of setting data to be used for printing by the printer, the plurality of setting modes including a first setting mode and a second setting mode different from the first setting mode, wherein the setting process in the first setting mode sets a set of setting data for a specific print whereas the setting process in the second setting mode sets a set of setting data used generally for printing, the set of program instructions, when executed by the computer, causing the information processing apparatus to perform:

executing the setting process in a current setting mode, the current setting mode being one of the first setting mode and the second setting mode;

acquiring from the printer a sheet size currently set in the printer via the communication interface;

extracting from the memory a set of setting data having sheet size data indicating a sheet size matching the acquired sheet size; and displaying setting indicated by the extracted set of setting data on the display.

15. An information processing apparatus comprising:
a communication interface;
a memory storing in advance a plurality of sets of setting data for printing by a printer, each set of setting data having sheet size data indicating a sheet size, each set of setting data being in association with setting mode data indicating a setting mode set to one of a plurality of setting modes for a setting process, the setting process setting a set of setting data to be used for printing by the printer, the plurality of setting modes including a first setting mode and a second setting mode different from the first setting mode, wherein the setting process in the first setting mode sets a set of setting data for a specific print whereas the setting process in the second setting mode sets a set of setting data used generally for printing; and
a control device configured to perform:
executing the setting process in a current setting mode, the current setting mode being one of the first setting mode and the second setting mode;
acquiring from the printer a sheet size currently set in the printer via the communication interface;
extracting from the memory a set of setting data having sheet size data indicating a sheet size matching the acquired sheet size; and
notifying information concerning a sheet size in a case where the extracting is executed successfully and setting mode data in association with the extracted set of setting data indicates a setting mode different from the current setting mode.

16. An information processing apparatus comprising:
a communication interface;
a memory storing in advance a plurality of sets of setting data for printing by a printer, each set of setting data having sheet size data indicating a sheet size, each set of setting data being in association with setting mode data indicating a setting mode set to one of a plurality of setting modes for a setting process, the setting process setting a set of setting data to be used for printing by the printer, the plurality of setting modes including a first setting mode and a second setting mode different from the first setting mode, wherein the setting process in the first setting mode sets a set of setting data for a specific print whereas the setting process in the second setting mode sets a set of setting data used generally for printing; and
a control device configured to perform:
acquiring a set of setting data including a sheet size and a setting mode; and
registering in the memory the acquired set of setting data and the acquired setting mode in association with each other,
wherein the control device is capable of setting the registered set of setting data in the registered setting mode so that the registered set of setting data is to be used for printing by the printer.

17. An information processing apparatus comprising:
a communication interface;
a memory storing a plurality of sets of setting data for printing by a printer, each set of setting data having sheet size data indicating a sheet size, each set of setting data being in association with setting mode data indicating a setting mode set to one of a plurality of setting modes for a setting process, the setting process setting a set of setting data to be used for printing by the printer, the plurality of setting modes including a first setting mode and a second setting mode different from the first setting mode, wherein the setting process in the first setting mode sets a set of setting data for a specific print whereas the setting process in the second setting mode sets a set of setting data used generally for printing; and
a control device configured to perform:
executing the setting process in a current setting mode, the current setting mode being one of the first setting mode and the second setting mode;
acquiring from the printer a sheet size currently set in the printer via the communication interface;
extracting from the memory a set of setting data having sheet size data indicating a sheet size matching the acquired sheet size; and
displaying setting indicated by the extracted set of setting data on the display.

* * * * *